(12) United States Patent
Nakanishi

(10) Patent No.: US 8,629,987 B2
(45) Date of Patent: Jan. 14, 2014

(54) OPTICAL-TYPE POSITION DETECTING DEVICE, HAND APPARATUS, AND TOUCH PANEL

(75) Inventor: Daisuke Nakanishi, Matsumoto (JP)

(73) Assignee: Seiko Epson Corporation (JP)

( * ) Notice: Subject to any disclaimer, the term of this patent is extended or adjusted under 35 U.S.C. 154(b) by 149 days.

(21) Appl. No.: 12/955,961

(22) Filed: Nov. 30, 2010

(65) Prior Publication Data

US 2011/0127788 A1     Jun. 2, 2011

(30) Foreign Application Priority Data

Dec. 1, 2009     (JP) ................................ 2009-273174

(51) Int. Cl.
G01B 11/14     (2006.01)

(52) U.S. Cl.
USPC ........ 356/614; 345/173; 250/231.1; 250/221; 702/41

(58) Field of Classification Search
USPC .................... 356/614; 250/231.1, 208.1, 221; 345/175
See application file for complete search history.

(56) References Cited

U.S. PATENT DOCUMENTS

| | | | | |
|---|---|---|---|---|
| 4,876,067 A * | 10/1989 | Deneke et al. | ................. | 422/424 |
| 4,908,762 A * | 3/1990 | Suzuki et al. | ................. | 600/407 |
| 6,043,890 A | 3/2000 | Spink et al. | | |
| 6,909,084 B2 | 6/2005 | Tachi et al. | | |
| 7,166,856 B2 * | 1/2007 | Cho et al. | ................. | 250/559.45 |
| 7,420,155 B2 * | 9/2008 | Mizota et al. | ................. | 250/221 |
| 7,460,964 B2 * | 12/2008 | Mizota et al. | ................... | 702/41 |
| 7,551,830 B2 | 6/2009 | Degroot et al. | | |
| 7,659,502 B2 * | 2/2010 | Tachi et al. | ................... | 250/221 |
| 7,719,696 B1 | 5/2010 | Nakayashiki | | |
| 2003/0155487 A1 | 8/2003 | Reime | | |
| 2003/0178556 A1 * | 9/2003 | Tachi et al. | ............... | 250/227.11 |
| 2004/0217267 A1 | 11/2004 | Reime | | |
| 2005/0128190 A1 | 6/2005 | Ryynanen | | |
| 2005/0280822 A1 * | 12/2005 | Zeng | ............................. | 356/402 |
| 2007/0040107 A1 * | 2/2007 | Mizota et al. | ................. | 250/221 |
| 2008/0245955 A1 * | 10/2008 | Tachi et al. | ................... | 250/221 |
| 2009/0295744 A1 | 12/2009 | Onishi | | |
| 2010/0020334 A1 | 1/2010 | Nakanishi | | |
| 2010/0305418 A1 | 12/2010 | Deliwala | | |
| 2011/0299095 A1 | 12/2011 | Morgan et al. | | |

FOREIGN PATENT DOCUMENTS

| | | |
|---|---|---|
| CN | 101336383 A | 12/2008 |
| JP | 2003-534554 A | 11/2003 |
| JP | 2004-535740 A | 11/2004 |
| JP | 2007-071564 | 3/2007 |
| JP | 2007-072669 A | 3/2007 |
| JP | 2009-066678 | 4/2009 |

(Continued)

OTHER PUBLICATIONS

Whitfield & Son Elastomers and Resins, http://www.whitson.co.uk/elastomers&resins.html.

*Primary Examiner* — Tarifur Chowdhury
*Assistant Examiner* — Isiaka Akanbi
(74) *Attorney, Agent, or Firm* — Harness, Dickey & Pierce, P.L.C.

(57) ABSTRACT

An optical detection device includes: a translucent unit that has elasticity; a light source unit that emits detection light toward the translucent unit; a light sensitive unit that is directed toward the translucent unit and has light sensitivity; and a detection unit that detects a target object based on the intensity of light received by the light sensitive unit.

8 Claims, 12 Drawing Sheets

(56) References Cited

FOREIGN PATENT DOCUMENTS

| JP | 2009-277214 A | 11/2009 |
| WO | WO-01-90770 A1 | 11/2001 |
| WO | WO 02/18893 | 3/2002 |
| WO | WO-03-009476 A1 | 1/2003 |

* cited by examiner

OPTICAL-TYPE POSITION DETECTING DEVICE, HAND APPARATUS, AND TOUCH PANEL

This application claims priority to Japanese Patent Application No. 2009-273174 filed Dec. 1, 2009 which is hereby expressly incorporated by reference herein in its entirety.

BACKGROUND

1. Technical Field

The present invention relates to an optical-type position detecting device capable of detecting the position of a target object located on one side of a translucent member and a hand apparatus and a touch panel that include the optical-type position detecting device.

2. Related Art

In robotic end effectors such as grippers, hand apparatuses and the like that are mounted on robot arms, optical-type position detecting devices that detect the position of a target object are used. The optical-type position detecting devices are configured to transmit the result of optical detection of a relative position of the target object and a hand as feedback. Generally, devices that use imaging devices have been proposed as such optical-type position detecting devices (see JP-A-2009-66678 and WO 02/18893A1). However, there are problems in that an optical-type position detecting device using an imaging device is expensive and takes a long time to process the result of the imaging operation. In addition, it is impossible to detect the gripping force at a time when the hand grips a target object from the imaged result acquired by the imaging device.

Meanwhile, a technology for optically detecting a compressive stress based on a change in the characteristics of an optical propagation medium at a time when the optical propagation medium receives a compressive stress from a target object has been proposed (JP-A-2007-71564). More specifically, the compressive stress is detected by emitting detection light toward a target object from the second face side of the optical propagation medium (translucent member) that is a side opposite to the first face side on which the target object is located and detecting the detection light reflected by the target object and transmitted to the second face side of the translucent member. According to this technology, unlike a case where an imaging device is used, the gripping force at a time when the hand grips a target object can be detected by employing a relatively simple configuration.

However, according to the technology disclosed in JP-A-2007-71564, although light reflected from a target object at a time when the target object presses the optical propagation medium is detected, the boundary state between the target object and the optical propagation medium is not stable. Thus, according to the technology disclosed in JP-A-2007-71564, there is a problem in that the burial depth (the relative position of the target object with respect to the translucent member) of the target object at a time when the target object presses the optical propagation medium (translucent member) cannot be accurately detected.

SUMMARY

An advantage of some aspects of the invention is that an optical-type position detecting device is provided that is capable of accurately detecting in an optical manner the burial depth at a time when the target object presses the translucent member and a hand apparatus and a touch panel that include the optical-type position detecting device.

According to a first aspect of the invention, there is provided an optical-type position detecting device that detects the position of a target object located on the first face side of a translucent member. The first face of the translucent member has elasticity and an embedding property in regard to the target object. A light source device that emits detection light from the second face side of the translucent member that is a side opposite to the first face side toward the translucent member, a light detector that detects the detection light reflected by the target object located on the first face side and transmitted to the second face side of the translucent member, a position detecting unit that detects the burial depth of the target object with respect to the translucent member based on the intensity of light received by the light detector at a time when the target object presses the first face are disposed therein.

According to the above-described aspect of the invention, the light source device emits detection light from the second face side of the translucent member that is a side opposite to the first face side, on which the target object is located, and the detection light that is reflected by the target object and is transmitted to the second face side of the translucent member is detected by the light detector. Here, the first face of the translucent member has elasticity. Thus, when the target object presses the first face of the translucent member, the translucent member is compressed so as to have a decreased thickness. In addition, the propagation characteristics may change depending on the material of the translucent member. Accordingly, the burial depth (the amount of burial) of the target object can be detected based on the intensity of light received by the light detector at a time when the target object presses the first face of the translucent member. In addition, the first face of the translucent member has an embedding property in regard to the target object. Thus, when the target object presses the first face of the translucent member, the first face of the translucent member is on the target object, and the boundary surface between the target object and the first face is in a stable state. Accordingly, the detection light is reflected by the boundary surface between the target object and the first face in a stable manner and is received by the light detector. Therefore, the burial depth (the relative position) of the target object with respect to the translucent member can be accurately detected in an optical manner.

In the above-described aspect of the invention, it is preferable that the light source device forms a light intensity distribution for separation distance detection, in which the intensity changes in the direction of the normal line of the first face, in a space located on the first face side of the translucent member, and the position detecting unit detects a position corresponding to the intensity of light received by the light detector and the light intensity distribution for separation distance detection as a separation distance between the target object and the translucent member. In the light intensity distribution for separation distance detection that is formed on the first face side of the translucent member, there is a predetermined relationship between the separation distance from the translucent member and the intensity. Thus, when the relationship between the separation distance from the translucent member and the intensity of the detection light is acquired in advance, the separation distance between the target object and the translucent member can be detected by using a common light detector.

In the above-described aspect of the invention, it is preferable that the position detecting unit determines that the target object is brought into contact with the translucent member when the intensity of light received by the light detector deviates from the light intensity distribution for separation distance detection. When the target object is brought into contact with the first face of the translucent member, boundary reflection of the detection light does not occur. Accordingly, the intensity of light received by the light detector has a value greatly deviated from the light intensity distribution for separation distance detection. Therefore, a position at a time when the intensity detected by the light detector deviates from the light intensity distribution for separation distance detection can be determined to be a position at which the target object is brought into contact with the translucent member by using the common light detector. In the aspect of the invention, the first face of the translucent member has an embedding property in regard to the target object. Thus, when the target object is brought into contact with the first face of the translucent member, the first face of the translucent member makes face-to-face contact with the target object. Accordingly, the state is clearly switched completely between a state in which the target object and the translucent member are in proximity to each other and a state in which the target object and the translucent member are brought into contact with each other. Thus, when the target object and the translucent member are brought into contact with each other, the intensity of the detection light detected by the light detector changes in a rapid manner. Therefore, the position detecting unit can accurately determine contact of the target object with the translucent member.

In addition, in the above-described aspect of the invention, it is preferable that the first face of the translucent member is formed from a silicone resin or silicone rubber. In a case where the first face of the translucent member is formed from a silicone resin or silicone rubber, a configuration in which the first face of the translucent member has elasticity and an embedding property in regard to the target object can be implemented easily.

In addition, in the above-described aspect of the invention, it is preferable that the light source unit for detection includes a light emitting diode that emits the detection light. When configured as such, the light source unit for detection can be configured to be miniaturized at low cost.

In addition, in the above-described aspect of the invention, it is preferable that the light detector is configured by a photodiode or a phototransistor. When configured as such, the light detector can be configured to be miniaturized at low cost.

In addition, in the above-described aspect of the invention, it is preferable that the light source device forms a light intensity distribution for in-plane position detection in which the intensity changes in the in-plane direction along the first face by emitting the detection light from the second face side, and the position detecting unit detects a position corresponding to the intensity of light received by the light detector and the light intensity distribution for in-plane position detection as the position of the target object in the in-plane direction. When configured as above, the position of the target object in the in-plane direction can be detected by using the common light detector.

The optical-type position detecting device according to the above-described aspect of the invention can be used in a hand apparatus that grips the target object. In such a case, it is preferable that the hand apparatus includes a hand that grips the target object, and the translucent member is disposed on a face of the hand that is brought into contact with the target object when the target object is gripped by the hand (e.g., a gripping surface of a gripper).

In addition, the optical-type position detecting device according to the above-described aspect of the invention can be used as a touch panel. In such a case, it is preferable that a configuration in which an input face formed from the first face of the translucent member is included is employed.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1A:
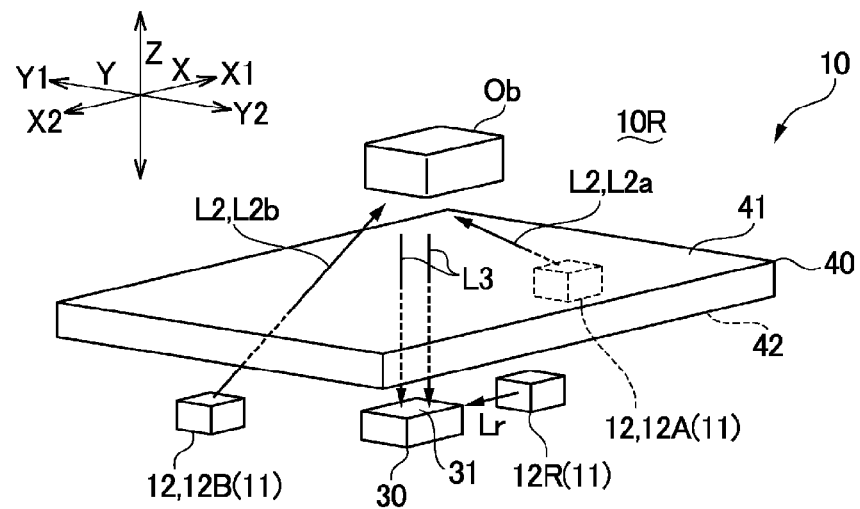
FIGS. 1A and 1B are explanatory diagrams schematically showing a major portion of an optical-type position detecting device according to Embodiment 1 of the invention.

Next, embodiments of the invention will be described in detail with reference to the accompanying drawings. In the description below, axes orthogonal to each other are set as the X axis, Y axis, and Z axis, and the direction in which a translucent member and a target object are separated from each other is described as the Z axis direction. In addition, in the drawings referred to below, one side in the X axis direction is denoted as the X1 side, and the other side is denoted as the X2 side, and one side in the Y axis direction is denoted as the Y1 side, and the other side is denoted as the Y2 side.

Embodiment 1

Entire Configuration

Figure 1B:
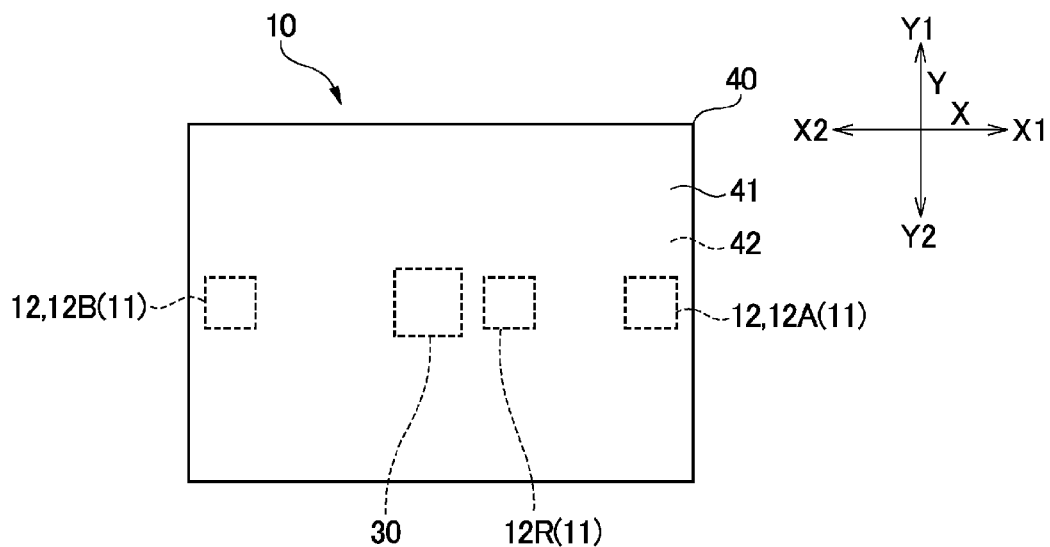
Figure 2:
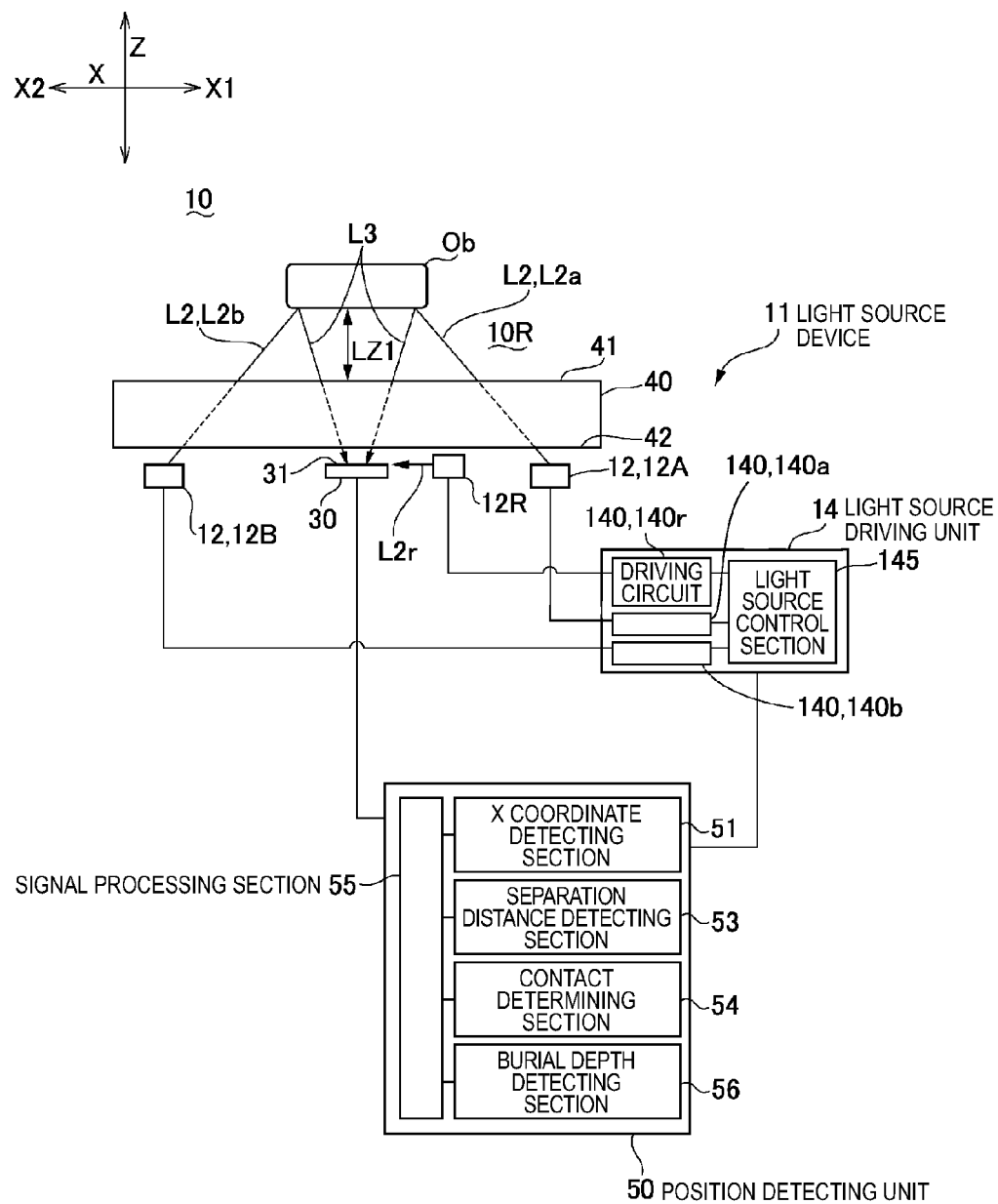
FIG. 2 is an explanatory diagram showing the entire configuration of the optical-type position detecting device according to Embodiment 1 of the invention.
Figure 3A:
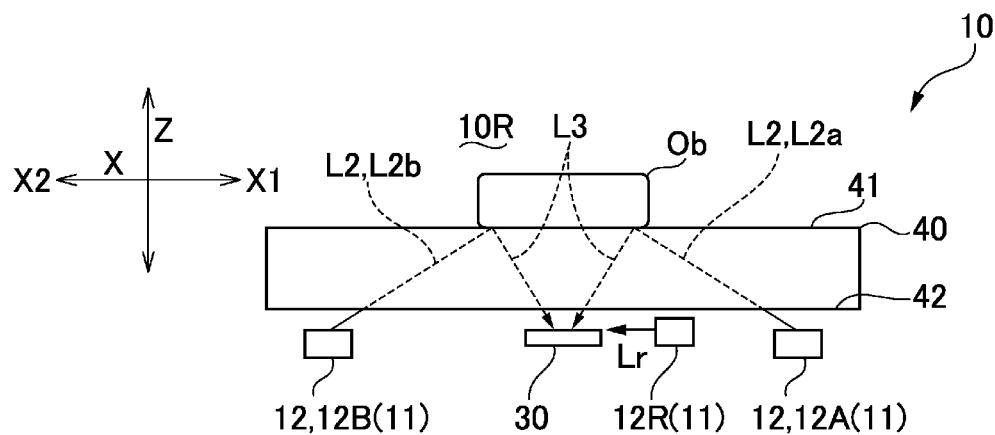
FIGS. 3A and 3B are explanatory diagrams schematically showing the state in which a target object is brought into contact with the translucent member and the like in the optical-type position detecting device according to Embodiment 1 of the invention.
Figure 3B:
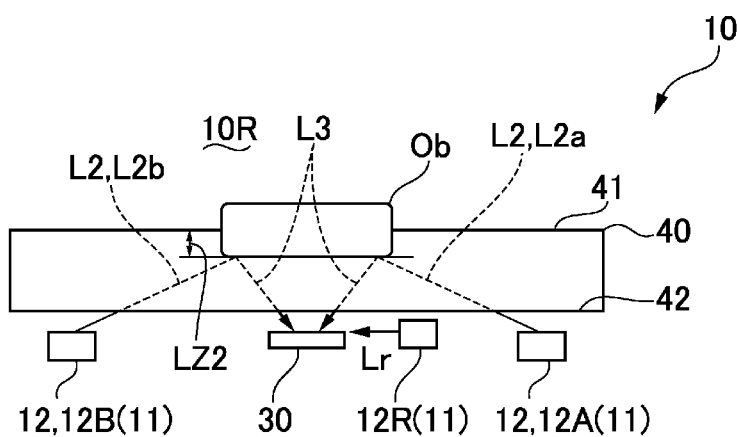

FIGS. 1A and 1B are explanatory diagrams schematically showing a major portion of an optical-type position detecting device according to Embodiment 1 of the invention. FIG. 1A is an explanatory diagram showing the three-dimensional disposition of constituent elements of the optical-type position detecting device, and FIG. 1B is an explanatory diagram showing the planar disposition of the constituent elements of the optical-type position detecting device. FIG. 2 is an explanatory diagram showing the entire configuration of the optical-type position detecting device according to Embodiment 1 of the invention. FIGS. 3A and 3B are explanatory diagrams schematically showing the state in which a target object is brought into contact with the translucent member and the like in the optical-type position detecting device according to Embodiment 1 of the invention. FIG. 3A is an explanatory diagram schematically showing the state in which the target object is brought into contact with the translucent member, and FIG. 3B is an explanatory diagram schematically showing the state in which the target object presses the translucent member.

In FIGS. 1A, 1B, and 2, the optical-type position detecting device 10 of this embodiment is an optical-type sensor device that detects a separation distance LZ1 (see FIG. 2) between a target object Ob, which is located on the first face 41 side of a sheet-shaped or plate-shaped translucent member 40, and the translucent member 40 and the like. The optical-type position detecting device 10 is used as a tactile sensor of a robot hand apparatus or a touch panel to be described later.

In order to perform such a detection operation, the optical-type position detecting device 10 of this embodiment includes: the sheet-shaped or plate-shaped translucent member 40 that has the first face 41 directed along the XY plane; a light source device 11 that emits detection light L2 from the second face 42 side of the translucent member 40 that is a side opposite to the first face 41 side thereof; and a light detector 30 that detects reflected light L3 being reflected by the target object Ob and being transmitted to the second face 42 side of the translucent member 40.

In this embodiment, the light source device 11 includes a plurality of light emitting elements 12, and the light emitting elements 12 are driven by a light source driving unit 14 shown in FIG. 2. In this embodiment, the light source device 11 includes two light emitting elements 12A and 12B as the plurality of light emitting elements 12. The light emitting elements 12A and 12B have light emitting faces that are directed toward the translucent member 40 in positions separated in the X axis direction. Here, the light emitting elements 12A and 12B are configured by LEDs (light emitting diodes) or the like. In this embodiment, the light emitting elements 12A and 12B emit detection light L2a and L2b that is formed of infrared rays as divergent light.

The light detector 30 is configured by a photodiode, a photo transistor, or the like that has a light sensitive portion 31 directed toward the translucent member 40. In this embodiment, the light detector 30 is a photodiode that has a peak sensitivity for a wavelength band of the detection light L2a and L2b. In this embodiment, the light detector 30 is disposed on the second face 42 side of the translucent member 40 between positions in which two light emitting elements 12A and 12B are disposed.

In the optical-type position detecting device 10 configured as described above, a detection region 1OR is set in a space located on the first face 41 side of the translucent member 40.

Figure 4A:
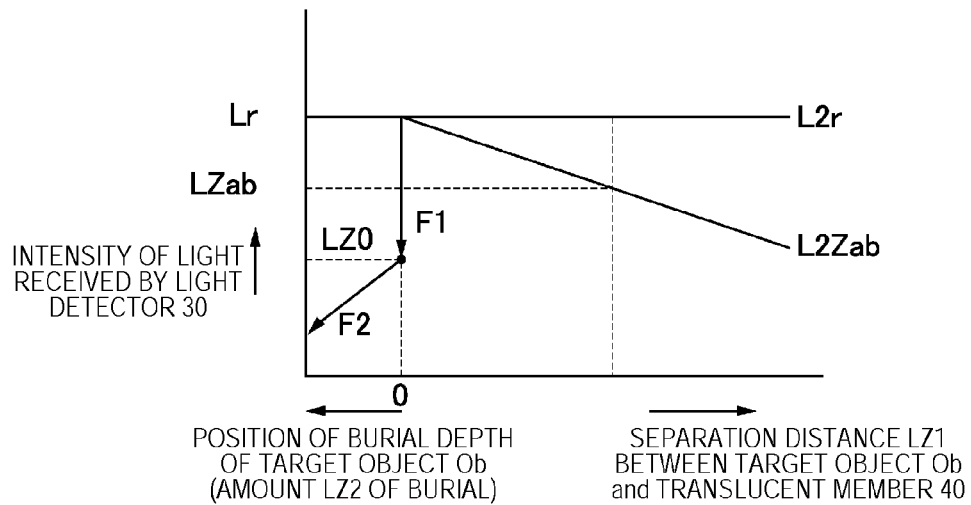
FIGS. 4A and 4B are explanatory diagrams representing the principle of detecting a separation distance between the translucent member and the target object in the optical-type position detecting device according to Embodiment 1 of the invention.
Figure 4B:
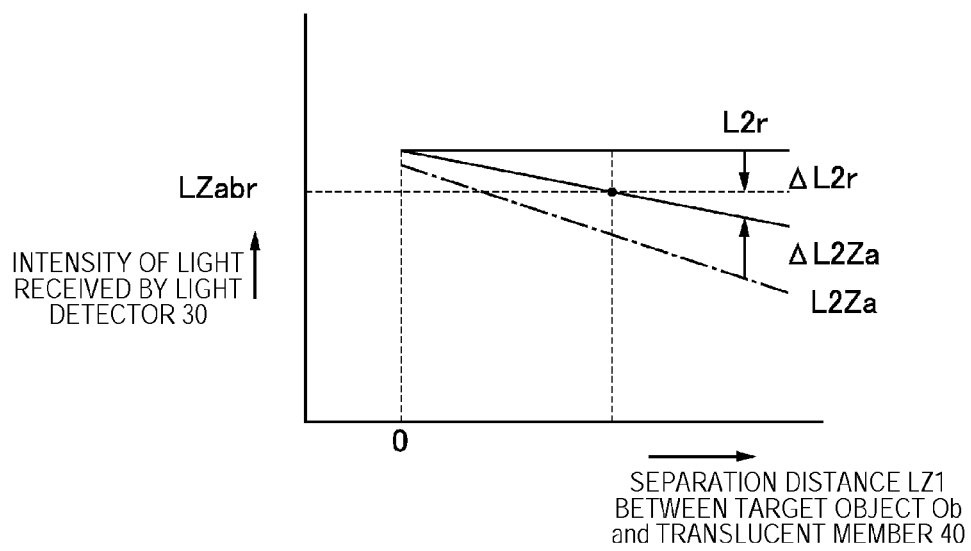

Thus, when the light emitting elements 12A and 12B of the light source device 11 simultaneously emit the detection light L2a and L2b, the detection light L2a and L2b, as will be described later with reference to FIGS. 4A and 4B, is transmitted through the translucent member 40 and forms a light intensity distribution L2Zab for separation distance detection in which the intensity changes in the direction (the Z-axis direction) of a normal line of the first face 41 on the first face 41 side (the detection region 10R). In the light intensity distribution L2Zab for separation distance detection, the intensity steadily decreases in the direction moving away from first face 41 of the translucent member 40. Such a change can be formed as a linear change by controlling the intensity distribution inside a limited space of the detection region 10R. In addition, in the light intensity distribution L2Zab for separation distance detection, the intensity is constant in the X axis direction. Thus, according to the optical-type position detecting device 10 of this embodiment, as will be described later, a separation distance LZ1 (Z coordinates) between the target object Ob and the translucent member 40 is detected by using the light intensity distribution L2Zab for separation distance detection and the detected intensity that is detected by the light detector 30.

In addition, in the optical-type position detecting device 10 of this embodiment, as shown in FIG. 3A, an extremely close position for a state in which the target object Ob and the translucent member 40 are brought into contact with each other, that is, a position at which the separation distance LZ1 becomes zero is also detected. Furthermore, in the optical-type position detecting device 10 of this embodiment, as shown in FIG. 3B, a burial depth LZ2 (the amount of burial) in the state in which the translucent member 40 is pressed by the target object Ob from the first face 41 side is also detected.

Referring back to FIG. 2, in this embodiment, in order to cancel the effects of external light and the like, the light source device 11 of the optical-type position detecting device 10 also includes a reference light emitting element 12R that emits reference light L2r toward the light detector 30. The reference light emitting element 12R, similarly to the light emitting elements 12 (the light emitting elements 12A and 12B) for position detection, is configured by an LED (light emitting diode) or the like, and the light emitting element 12R emits the reference light L2r that is formed from infrared rays as divergent light. However, alight shielding cover (not shown in the figure) is disposed in the reference light emitting element 12R. Accordingly, the reference light L2r emitted from the reference light emitting element 12R is not incident to the first face 41 side (the detection region 10R) of the translucent member 40.

In the optical-type position detecting device 10 of this embodiment, two light emitting elements 12 (light emitting elements 12A and 12B) that are separated in the X axis direction are used. Accordingly, detection light L2 (the detection light L2a and L2b) emitted from two light emitting elements (the light emitting elements 12A and 12B), as will be described later, is transmitted through the translucent member 40 and also forms a light intensity distribution (a light intensity distribution for detection of X coordinates) for in-plane direction position detection in which the intensity changes in the in-plane direction (the X axis direction) along the first face 41 on the first face 41 side (the detection region 10R). In the light intensity distribution for in-plane direction position detection, the intensity steadily decreases in the direction moving away from the position of the light emitting element 12. Such a change can be formed as a linear change by controlling the light intensity distribution inside the limited space of the detection region 10R. Thus, according to the optical-type position detecting device 10 of this embodiment, as will be described later, the position (X coordinates) of the translucent member 40 in the in-plane direction is also detected by using the light intensity distribution for in-plane direction position detection and the detected intensity that is detected by the light detector 30.

In order to perform such a detection operation, according to the optical-type position detecting device 10 of this embodiment, the light source driving unit 14 of the light source device 11 includes a light source driving circuit 140 that drives the light emitting elements 12 and a light source control section 145 that controls the lighting patterns of the plurality of light emitting elements 12 through the light source driving circuit 140. The light source driving circuit 140 includes a light source driving circuit 140a that drives a light emitting element 12A, a light source driving circuit 140b that drives the light emitting element 12B, and a light source driving circuit 140r that drives the reference light emitting element 12R. The light source control section 145 controls all the light source driving circuits 140a, 140b, and 140r.

Since a position detecting unit 50 is electrically connected to the light detector 30, a detection result acquired by the light detector 30 is output to the position detecting unit 50. The position detecting unit 50 includes: a signal processing section 55 that includes an amplifier and the like; an X coordinate detecting section 51; a separation distance detecting section 53 (a Z coordinate detecting section); a contact determining section 54; and a burial depth detecting section 56 (the Z coordinate detecting section and a burial amount detecting section). The light source driving unit 14 and the position detecting unit 50 operate in association with each other, thereby performing position detection to be described later.

Configuration of Translucent Member 40

According to the optical-type position detecting device 10 of this embodiment, at least the first face 41 side of the translucent member 40 has elasticity, and the translucent member 40 has an embedding property in regard to the target object Ob. In this embodiment, since a sheet or a board made of a silicone resin or silicone rubber is used as the translucent member 40, the entirety of the translucent member 40 has elasticity. Accordingly, as shown in FIG. 3A, when the target object Ob is brought into contact with the first face 41 of the translucent member 40, the first face 41 is in the state of face-to-face contact with the target object Ob. In addition, as shown in FIG. 3B, when the target object Ob presses the first face 41 of the translucent member 40, the target object Ob is buried into the first face 41.

In addition, the entirety of the translucent member 40 may not have elasticity, and only the first face 41 side may be configured to have elasticity and an embedding property in regard to the target object Ob. For example, the translucent member 40 may have a configuration in which a silicone resin layer or a silicone rubber layer is formed on the side of the first face 41 that is a resin plate made of acryl or the like or a glass plate.

Method of Detecting Light Intensity Distribution for Separation Distance Detection and Separation Distance LZ1

FIGS. 4A and 4B are explanatory diagrams representing the principle of detecting a separation distance between the translucent member and the target object in the optical-type position detecting device according to Embodiment 1 of the invention. FIG. 4A is an explanatory diagram showing the intensity distribution of detection light in the Z axis direction. FIG. 4B is an explanatory diagram showing the appearance of adjusting the intensity distributions of the detection light such that the intensities of the detection light reflected by the target object Ob are the same.

According to the optical-type position detecting device 10 of this embodiment, when the light emitting elements 12A and 12B are lit during a detection light detecting period, as shown in FIG. 4A, on the first face 41 side (the detection region 10R) of the translucent member 40, a light intensity distribution L2Zab for separation distance detection (a light intensity distribution for detection of Z coordinates) in which the intensity steadily decreases in the direction of a normal line of the first face 41 is formed. According to this embodiment, in the light intensity distribution L2Zab for separation distance detection, the intensity linearly decreases as the target object 40 moves away from the first face 41 of the translucent member 40, and the intensity of detection light L2 is constant in the X axis direction. Accordingly, during the detection light detecting period, in a state in which the reference light emitting element 12R is not lit and the light emitting elements 12A and 12B are lit, when a target object Ob is disposed in the detection region 10R, the detection light L2 (the detection light L2a and L2b) is reflected by the target object Ob, and a part of the reflected light L3 is detected by the light detector 30. Here, there is a predetermined relationship between the intensity of the detection light L2 (the detection light L2a and L2b) received in the light detector 30 and the intensity corresponding to the position of the target object Ob in the light intensity distribution L2Zab for separation distance detection, for example, a proportional relationship.

In contrast to this, when the reference light emitting element 12R is lit during a reference light detecting period, a part of the reference light L2r emitted from the light emitting element 12R is detected by the light detector 30. Here, since the reference light L2r is not reflected by the target object Ob, the intensity Lr of the reference light L2r received in the light detector 30, as shown in FIG. 4A, is constant regardless of the position of the target object Ob.

In the example shown in FIGS. 4A and 4B, the detection intensity of the reference light L2r in the light detector 30 is matched to the intensity of the detection light L2 (the detection light L2a and L2b) detected by the light detector 30 when the target object Ob is in a position right before the target object Ob is brought into contact with the first face 41.

By using the light intensity distribution L2Zab for separation distance detection and the reference light L2r, a separation distance LZ1 (the Z coordinates) between the target object Ob and the translucent member 40 can be detected by using a method described below.

For example, according to the first method, as shown in FIG. 4A, a difference between the light intensity distribution L2Zab for separation distance detection and the intensity Lr of the reference light L2r received in the light detector 30 is used. More specifically, since the light intensity distribution L2Zab for separation distance detection is a distribution that is set in advance in the Z axis direction, the difference between the light intensity distribution L2Zab for separation distance detection and the intensity of the reference light L2r in the light detector 30 is also a function that is set in advance. Accordingly, when the separation distance detecting section 53 acquires a difference between a detected value LZab in the light detector 30 at the time of formation of the light intensity distribution L2Zab for separation distance detection during the detection light detecting period and a detected value Lr in the light detector 30 at the time of emission of the reference light L2r during the reference light detecting period, a separation distance LZ1 (the Z coordinates) between the target object Ob and the first face 41 of the translucent member 40 can be detected. According to such a method, even in a case where surrounding light other than the detection light L2, for example, an infrared component included in external light is incident to the light detector 30, the intensity of the infrared component included in the surrounding light is offset when the difference between the detected values LZab and Lr is acquired. Therefore, the infrared component included in the surrounding light has no influence on the accuracy of detection. In addition, the Z coordinates of the target object Ob can also be detected based on the ratio and/or differences between a detected value at the time of lighting the light emitting element 12A, a detected value at the time of lighting the light emitting element 12B, and a detected value Lr at the time of lighting the light emitting element 12R.

Next, the second method is a method in which the separation distance LZ1 (the Z coordinates) between the target object Ob and the first face 41 of the translucent member 40 is detected based on the adjustment amounts at a time when the amounts of control (driving current values) for the light emitting elements 12A and 12B used for position detection and the amount of control (a driving current value) for the reference light emitting element 12R are adjusted such that the detected value LZab in the light detector 30 during the detection light detecting period and the detected value Lr in the light detector 30 during the reference light detecting period are the same.

In such a method, first, as shown in FIG. 4A, during the detection light detecting period, the detected value LZab in the light detector 30 at a time when the light intensity distribution L2Zab for separation distance detection is formed by lighting the light emitting elements 12A and 12B for position detection and not lighting the reference light emitting element 12R is acquired. Next, during the reference light detecting period, the detected value Lr in the light detector 30 at a time when the light emitting elements 12A and 12B for position detection are not lit and the reference light emitting element 12R is lit is acquired. At that time, when the detected value LZab in the light detector 30 at the time when the light intensity distribution L2Zab for separation distance detection is formed is the same as the detected value Lr of the reference light L2r in the light detector 30, it can be determined that the target object Ob is located in a position right before being brought into contact with the first face 41.

In contrast to this, when the detected value LZab in the light detector 30 at the time when the light intensity distribution L2Zab for separation distance detection is formed and the detected value Lr of the reference light L2r in the light detector 30 are different from each other, the amounts of control (the driving current values) for the light emitting elements 12A and 12B for position detection and the amount of control (the driving current value) for the reference light emitting element 12R are adjusted such that the detected values LZab and Lr are the same. Then, as shown in FIG. 4B, again, the detected value LZab in the light detector 30 at the time when the light intensity distribution L2Zab for separation distance detection is formed during the detection light detecting period and the detected value Lr of the reference light L2r in the light detector 30 during the reference light detecting period are acquired.

As a result, when the detected value LZab in the light detector 30 at the time when the light intensity distribution L2Zab for separation distance detection is formed and the detected value Lr of the reference light L2r in the light detector 30 become a value LZabr and thus equal, a separation distance LZ1 (the Z coordinates) between the target object Ob and the first face 41 of the translucent member 40 can be detected by the separation distance detecting section 53 based on the ratio or differences between an adjustment amount $\Delta$L2Zab of the amount of control for the light emitting elements 12A and 12B for position detection and an adjustment amount $\Delta$L2r of the amount of control for the reference light emitting element 12R. According to such a method, even in a case where surrounding light other than the detection light L2, for example, an infrared component included in external light is incident to the light detector 30, the intensity of the infrared component included in the surrounding light is offset when the amounts of control for the light emitting elements 12A and 12B for position detection and the reference light emitting element 12R are adjusted such that the detected values LZab and Lr are the same. Therefore, the infrared component included in the surrounding light has no influence on the accuracy of detection. In addition, in the above-described second method, although both the amount of control for the light emitting elements 12A and 12B for position detection and the amount of control for the reference light emitting element 12R are adjusted, only one thereof need be adjusted.

As described above, in order to acquire the positional information of the target object Ob in the Z axis direction based on the detection result acquired in the light detector 30, a configuration in which, for example, a microprocessor unit (MPU) is used as the position detecting unit 50, and the process is performed by executing predetermined software (an operation program) using the microprocessor unit may be employed. In addition, as shown in FIGS. 5A and 5B, a configuration in which the process is performed by a signal processing unit using hardware such as a logic circuit may be employed.

Configuration Example of Position Detecting Unit 50

Figure 5A:
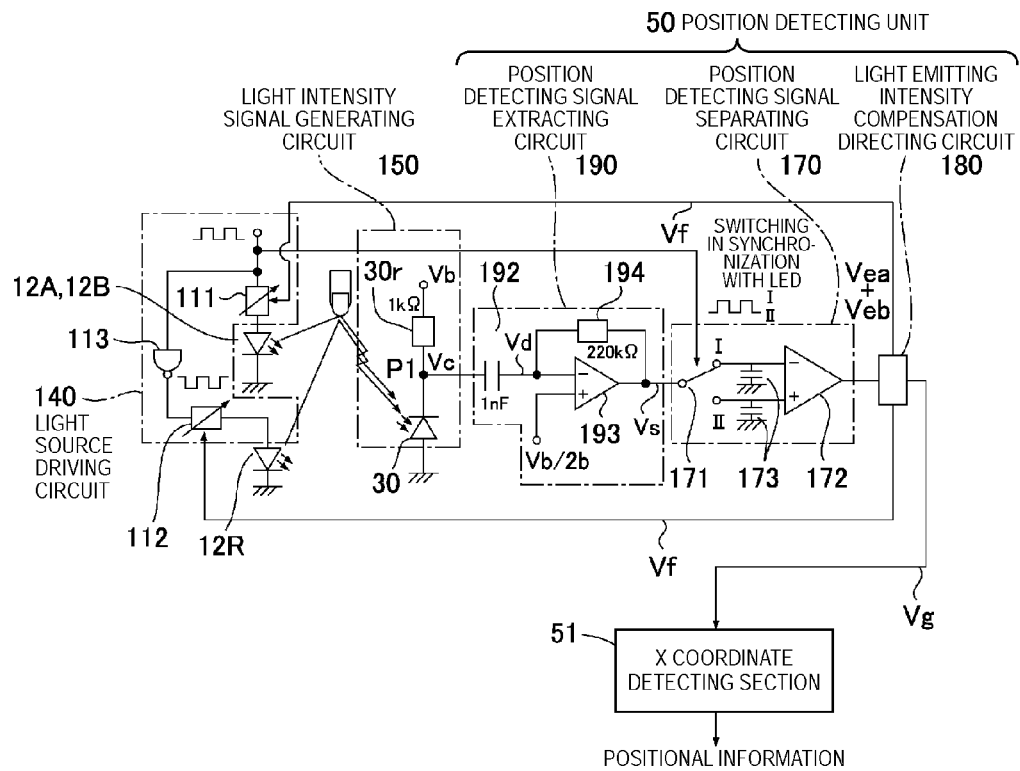
FIGS. 5A and 5B are explanatory diagrams representing the signal processing contents in an optical-type position detecting device according to Embodiment 1 of the invention.
Figure 5B:
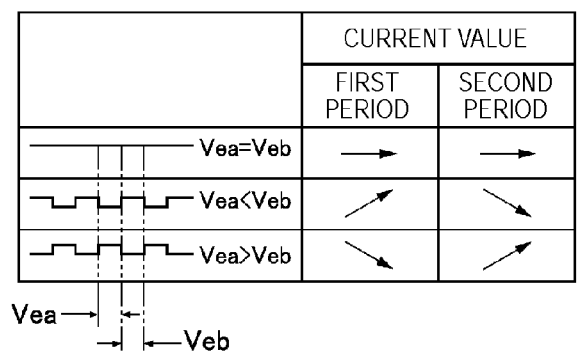

FIGS. 5A and 5B are explanatory diagrams representing the signal processing contents in an optical-type position detecting device 10 according to Embodiment 1 of the invention. FIG. 5A is an explanatory diagram of the position detecting unit 50 of the optical-type position detecting device 10 according to Embodiment 1 of the invention, and FIG. 5B is an explanatory diagram representing the processing contents in a light emitting intensity compensation directing section of the position detecting unit 50. The position detecting unit shown here detects a separation distance LZ1 (the Z coordinate) between the target object Ob and the first face 41 of the translucent member 40 based on the adjustment amounts at a time when the amounts of control (the driving current values) for the light emitting elements 12A and 12B for position detection and the amount of control (the driving current value) for the reference light emitting element 12R are adjusted such that the detected value LZab of the detection light L2 (the detection light L2a and L2b) in the light detector 30 and the detected value Lr of the reference light L2r in the light detector 30 are the same.

As shown in FIG. 5A, in the optical-type position detecting device 10 of this embodiment, the light source driving circuit 140 is represented as applying a driving pulse with a predetermined current value to the light emitting elements 12A and 12B for position detection through a variable resistor 111 during the detection light detecting period and applying a driving pulse with a predetermined current value to the reference light emitting element 12R through a variable resistor 112 and an inverter circuit 113 during the reference light detecting period. Accordingly, the light source driving circuit 140 applies driving pulses having opposite phases to the light emitting elements 12A and 12B and the light emitting element 12R during the detection light detecting period and the reference light detecting period. Then, light acquired by reflecting the detection light L2 at a time when the light intensity distribution L2Zab for separation distance detection is formed from the target object Ob is received by the light detector 30, which is in common, during the detection light detecting period, and the reference light L2r is received by the light detector 30, which is in common, during the reference light detecting period. In a light intensity signal generating circuit 150, a resistor 30r with about 1 kΩ is electrically connected to the light detector 30 in series, and a bias voltage Vb is applied to both ends thereof.

In the light intensity signal generating circuit 150, the position detecting unit 50 is electrically connected to a connection point P1 of the light detector 30 and the resistor 30r. A detection signal Vc that is output from the connection point P1 of the light detector 30 and the resistor 30r is represented as the following equation.

$$Vc = V30/(V30 + \text{resistance value of resistor } 30r)$$

Here, V30 is an equivalent resistance value of the light detector 30. Thus, when a case where surrounding light is not incident to the light detector 30 and a case where surrounding light is incident to the light detector 30 are compared with each other, the level and the amplitude of the detection signal Vc are relatively high in the case where surrounding light is incident to the light detector 30.

Generally, the position detecting unit 50 includes a position detecting signal extracting circuit 190, a position detecting signal separating circuit 170, and a light emitting intensity compensation directing circuit 180.

The position detecting signal extracting circuit 190 includes a filter 192 that is configured by a capacitor with capacitance of about 1 nF. Thus, the filter 192 serves as a high pass filter that eliminates a DC component from the signal output from the connection point P1 of the light detector 30 and the resistor 30r. Accordingly, from the detection signal Vc that is output from the connection point P1 of the light detector 30 and the resistor 30r, only a position detecting signal Vd acquired by the light detector 30 during the detection light detecting period and the reference light detecting period is extracted by the filter 192. In other words, while the detection light L2 and the reference light L2r are modulated, the surrounding light can be regarded to have a constant intensity during a period in which there is the surrounding light. Accordingly, a low frequency component or a DC component due to the surrounding light is eliminated by the filter 192.

In addition, the position detecting signal extracting circuit 190 has an adder circuit 193 that includes a feedback resistor 194 having a resistance value of about 220 kΩ in the latter stage of the filter 192. Accordingly, the position detecting signal Vd extracted by the filter 192 is output to the position detecting signal separating circuit 170 as a position detecting signal Vs overlapping with a voltage V/2 that is ½ times the bias voltage Vb.

The position detecting signal separating circuit 170 includes: a switch 171 that performs a switching operation in synchronization with a driving pulse applied to the light emitting element 12 during the detection light detecting period; a comparator 172; and a capacitor 173 that is electrically connected to the input line of the comparator 172. Accordingly, when the position detecting signal Vs is input to the position detecting signal separating circuit 170, an effective value Vea of the position detecting signal Vs during the detection light detecting period and an effective value Veb of the position detecting signal Vs during the reference light detecting period are alternately output to the light emitting intensity compensation directing circuit 180 from the position detecting signal separating circuit 170.

The light emitting intensity compensation directing circuit 180 compares the effective values Vea and Veb with each other, performs a process represented in FIG. 5B, and outputs a control signal Vf to the light source driving circuit 140 such that the effective value Vea of the position detecting signal Vs during the detection light detecting period (the first period) and the effective value Veb of the position detecting signal Vs during the reference light detecting period (the second period) are at the same level. In other words, the light emitting intensity compensation directing circuit 180 compares the effective value Vea of the position detecting signal Vs during the detection light detecting period and the effective value Veb of the position detecting signal Vs during the reference light detecting period with each other and maintains the driving conditions of the current state in a case where the effective values are the same. On the other hand, in a case where the effective value Vea of the position detecting signal Vs during the detection light detecting period is less than the effective value Veb of the position detecting signal Vs during the reference light detecting period, the light emitting intensity compensation directing circuit 180 increases the amount of light emitted from the light emitting element 12 during the detection light detecting period by decreasing the resistance value of the variable resistor 111. In addition, in a case where the effective value Veb of the position detecting signal Vs during the reference light detecting period is less than the effective value Vea of the position detecting signal Vs during the detection light detecting period, the light emitting intensity compensation directing circuit 180 increases the amount of light emitted during the reference light detecting period by decreasing the resistance value of the variable resistor 112.

As above, according to the optical-type position detecting device 10, the amount of control (the amount of the current) of the light emitting element 12 is controlled such that the detection amounts detected by the light detector 30 during the detection light detecting period and the reference light detecting period are the same by using the light emitting intensity compensation directing circuit 180 of the position detecting unit 50. Thus, in the light emitting intensity compensation directing circuit 180, there is information on the amount of control for the light emitting element 12 for allowing the effective value Vea of the position detecting signal Vs during the detection light detecting period and the effective value Veb of the position detecting signal Vs during the reference light detecting period to be at the same level. Accordingly, by outputting such information to the separation distance detecting section 53 as the position detecting signal Vg, the separation distance detecting section 53 can acquire the separation distance (the Z coordinates) between the target object Ob and the translucent member 40.

In addition, in this embodiment, the filter 192 of the position detecting signal extracting circuit 190 eliminates a DC component due to the surrounding light from the detection signal Vc output from the connection point P1 of the light detector 30 and the resistor 30r so as to extract the position detecting signal Vd. Accordingly, even when a signal component due to the infrared component of the surrounding light is included in the detection signal Vc output from the connection point P1 between the light detector 30 and the resistor 30r, the influence of the surrounding light can be cancelled.

Determination of Contact State

As above, in this embodiment, although the separation distance LZ1 (the Z coordinates) between the target object Ob and the first face 41 of the translucent member 40 is detected, it is difficult to detect the moment at which the target object Ob is brought into contact with the first face 41 of the translucent member 40 with high accuracy. Thus, in this embodiment, as shown in FIG. 3A, a state in which the first face 41 of the translucent member 40 is on the target object Ob is detected when the target object Ob is brought into contact with the first face 41 of the translucent member 40.

In other words, when the target object Ob and the translucent member 40 are separated at least a little from each other, the detection light L2 (the detection light L2a and L2d) is transmitted through the translucent member 40, then is reflected by the target object Ob in a boundary reflection manner, and then arrives at the light detector 30 by being transmitted through the translucent member 40. Accordingly, when the target object Ob and the translucent member 40 are separated at least a little from each other, the detection intensity acquired by the light detector 30 has a value according to the light intensity distribution L2Zab for separation distance detection that is shown in FIG. 4A. Such a condition is satisfied until immediately before the target object Ob is brought into contact with the first face 41 of the translucent member 40.

In contrast to this, in a case where the target object Ob is brought into contact with the first face 41 of the translucent member 40 so as to form a state in which the first face 41 is on the target object Ob, even when the detection light L2 (the detection light L2a and L2d) travels inside the translucent member 40 and arrives at an area in which the target object Ob is embedded into the translucent member 40, boundary reflection does not occur, and most of the detection light L2 is absorbed. Accordingly, in a case where the target object Ob is brought into contact with the first face 41 of the translucent member 40, the intensity of light received by the light detector 30, as denoted by an arrow F1 shown in FIG. 4A, deviates from the relationship that is defined as the light intensity distribution L2Zab for separation distance detection so as to have an extremely low value LZO. Therefore, the contact determining section 54 can determine a position at a time when the intensity detected by the light detector 30 becomes a value that deviates from the light intensity distribution L2Zab for separation distance detection to be a position at which the target object Ob is brought into contact with the translucent member 40.

In addition, according to this embodiment, the first face 41 of the translucent member 40 is formed from a silicone resin that has elasticity and an embedding property in regard to the target object Ob. Accordingly, when the target object Ob is brought into contact with the translucent member 40, the first face 41 of the translucent member 40 is deformed so as to be embedded with the target object Ob. Therefore, the state is clearly switched completely between a state in which the target object Ob and the translucent member 40 are in proximity to each other and a state in which the target object Ob and the translucent member 40 are brought into contact with each other.

Detection of Burial Depth LZ2

In addition, according to this embodiment, as shown in FIG. 3B, a burial depth LZ2 (the amount of burial) in the state in which the target object Ob presses the translucent member 40 from the first face 41 side is also detected. In such detection of the burial depth LZ2, the same principle as that of the method of detecting the separation distance LZ1 is employed. More specifically, as shown in FIG. 3B, when the target object Ob presses the translucent member 40 from the first face 41 side, the intensity of light received by the light detector 30, as denoted by an arrow F2 shown in FIG. 4A, changes in accordance with the burial depth LZ2 of the target object Ob. For example, when the target object Ob presses the first face 41 of the translucent member 40, the translucent member 40 is compressed so as to have a decreased thickness. Such a change acts in the direction for increasing the intensity of light received by the light detector 30. In addition, when the target object Ob presses the first face 41 of the translucent member 40, the translucent member 40 is compressed so as to change its optical propagation characteristics. Such a change acts in the direction for decreasing the intensity of light received by the light detector 30. Thus, when the target object Ob presses the first face 41 of the translucent member 40, the intensity of light received by the light detector 30 changes in accordance with the composition of the amount of change corresponding to the change in the thickness of the translucent member 40 and the amount of change corresponding to the change in the optical propagation characteristics of the translucent member 40. Accordingly, the intensity of light received by the light detector 30 changes as denoted by the arrow F2 shown in FIG. 4A in accordance with the position (the burial depth LZ2) at the time when the target object Ob is buried in the translucent member 40. In FIG. 4A, the intensity of light received by the light detector 30 is represented as linearly decreasing in association with the burial depth LZ2 of the target object Ob.

The burial depth LZ2 can be detected by employing the same principle as that of detecting the separation distance LZ1 described with reference to FIGS. 4A and 4B and FIGS. 5A and 5B. In other words, when the target object Ob presses the translucent member 40 so as to be buried in the state in which the light emitting elements 12A and 12B for position detection are lit and the reference light emitting element 12R is not lit during the detection light detecting period, the detection light L2 (the detection light L2a and L2b) is reflected by the boundary surface between the first face 41 of the translucent member 40 and the target object Ob, and a part of the reflected light L3 is detected by the light detector 30. Here, the intensity of the detection light L2 (the detection light L2a and L2b) received by the light detector 30 corresponds to the burial depth LZ2 of the target object Ob.

On the other hand, during the reference light detecting period, when the light emitting elements 12A and 12B for position detection are not lit and the reference light emitting element 12R is lit, a part of the reference light L2r emitted from the light emitting element 12R is detected by the light detector 30. Here, since the reference light L2r is not reflected by the target object Ob, the intensity Lr of the reference light L2r received by the light detector 30 is constant regardless of the burial depth LZ2 of the target object Ob.

Accordingly, when the relationship between the burial depth LZ2 and the intensity of the detection light L2 received by the light detector 30 is acquired in advance, the burial depth detecting section 56 can detect the burial depth LZ2 of the target object Ob based on the intensity of light received by the light detector 30 during the detection light detecting period and the intensity of light received by the light detector 30 during the reference light detecting period. More specifically, the burial depth detecting section 56 can detect the burial depth LZ2 of the target object Ob by using the first or second method described in terms of detection of the separation distance LZ1 (the Z coordinates) between the target object Ob and the translucent member 40. At that time, by using the first or second method, the burial depth LZ2 can be detected without being influenced by the external light.

Here, the first face 41 of the translucent member 40 is formed from a silicone resin or silicone rubber that has elasticity and an embedding property in regard to the target object Ob. Accordingly, during the period in which the target object Ob presses the translucent member 40, the first face 41 of the translucent member 40 is buried in the state of being embedded with the target object Ob.

Detection of X Coordinate

Since the optical-type position detecting device 10 of this embodiment includes two light emitting elements 12 (the light emitting elements 12A and 12B) in positions separated from each other in the X axis direction, the X coordinate of the target object Ob can be detected by using the light intensity distribution formed by the light emitting element 12A and the light intensity distribution formed by the light emitting element 12B. Here, the configuration of the light intensity distribution and the principle of detection of the X coordinate will be described with reference to FIGS. 6A and 6B.

Figure 6A:
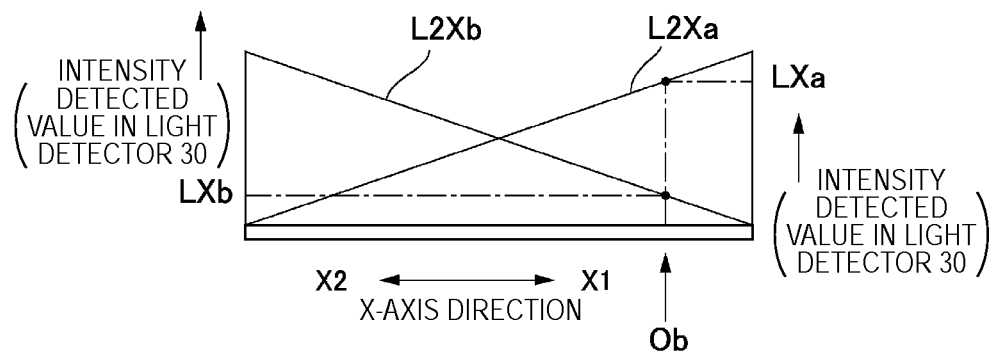
FIGS. 6A and 6B are explanatory diagrams representing the principle of detection of the X coordinate that is employed by an optical-type position detecting device according to Embodiment 1 of the invention.
Figure 6B:
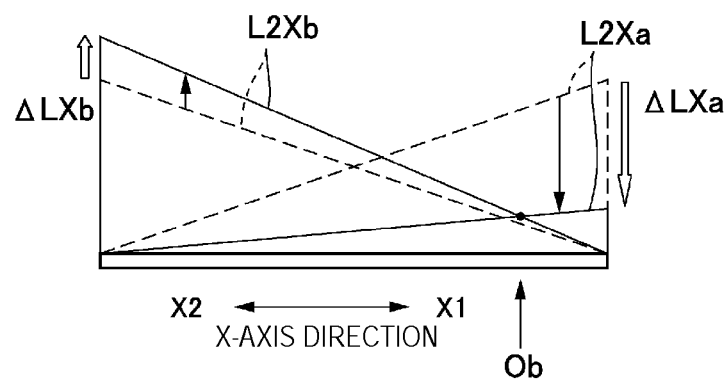

FIGS. 6A and 6B are explanatory diagrams representing the principle of detection of the X coordinate that is employed by an optical-type position detecting device according to Embodiment 1 of the invention. FIG. 6A is an explanatory diagram representing the intensity distribution of detection light in the X axis direction. FIG. 6B is an explanatory diagram representing the appearance of adjusting the intensity distribution of the detection light so that the intensities of the detection light reflected by the target object Ob are the same.

In the optical-type position detecting device 10 of this embodiment, in order to detect the X coordinate, as shown in FIG. 6A, first, during the first period for X coordinate detection, by lighting the light emitting element 12A and not lighting the light emitting element 12B, the first light intensity distribution L2Xa for X coordinate detection in which the intensity steadily decreases from one side X1 in the X axis direction toward the other side X2 is formed. In addition, during the second period for X coordinate detection, by not lighting the light emitting element 12A and lighting the light emitting element 12B, the second light intensity distribution L2Xb for X coordinate detection in which the intensity steadily decreases from the other side X2 in the X axis direction toward the one side X1 is formed. Preferably, after the first light intensity distribution L2Xa for X coordinate detection in which the intensity linearly decreases from the one side X1 in the X axis direction toward the other side X2 is formed during the first period for X coordinate detection, during the second period for X coordinate detection, the second light intensity distribution L2Xb for X coordinate detection in which the intensity linearly decreases from the other side X2 in the X axis direction toward the one side X1 is formed. Accordingly, when a target object Ob is disposed in a detection region 10R, the detection light L2 is reflected by the target object Ob, and a part of the reflected light is detected by the light detector 30. Here, when the first light intensity distribution L2Xa for X coordinate detection that is formed during the first period for X coordinate detection and the second light intensity distribution L2Xb for X coordinate detection that is formed during the second period for X coordinate detection are set in advance, the X coordinate detecting section 51 can detect the X coordinate of the target object Ob based on the detection result acquired by the light detector 30 by using the following method or the like.

For example, according to the first method, a difference between the first light intensity distribution L2Xa for X coordinate detection and the second light intensity distribution L2Xb for X coordinate detection shown in FIG. 6A is used. More specifically, since the first light intensity distribution L2Xa for X coordinate detection and the second light intensity distribution L2Xb for X coordinate detection are formed as distributions set in advance, a difference between the first light intensity distribution L2Xa for X coordinate detection and the second light intensity distribution L2Xb for X coordinate detection is also a function that is set in advance. Accordingly, when a difference between a detected value LXa in the light detector 30 at the time of formation of the first light intensity distribution L2Xa for X coordinate detection during the first period for X coordinate detection and a detected value LXb in the light detector 30 at the time of formation of the second light intensity distribution L2Xb for X coordinate detection during the second period for X coordinate detection is acquired, the X coordinate of the target object Ob can be detected. According to this method, even in a case where surrounding light other than the detection light L2, for example, an infrared component included in external light is incident to the light detector 30, the intensity of the infrared component included in the surrounding light is offset when the difference between the detected values LXa and LXb is acquired. Therefore, the infrared component included in the surrounding light has no influence on the accuracy of detection. In addition, the X coordinate of the target object Ob can also be detected based on the ratio between the detected values LXa and LXb.

Next, the second method is a method in which the X coordinate of the target object Ob is detected based on the adjustment amount at a time when the amount of control (the driving current) for the light emitting element 12 is adjusted such that a detected value LXa in the light detector 30 at the time of formation of the first light intensity distribution L2Xa for X coordinate detection during the first period for X coordinate detection and a detected value LXb in the light detector 30 at the time of formation of the second light intensity distribution L2Xb for X coordinate detection during the second period for X coordinate detection are the same. Such a method can be applied to a case where the first light intensity distribution L2Xa for X coordinate detection and the second light intensity distribution L2Xb for X coordinate detection shown in FIG. 6A linearly change with respect to the X coordinates. In this example, the detection light Lb out of detection light La emitted by the light emitting element 12A and the detection light Lb emitted by the light emitting element 12B is used as the reference light, during the first period, and the detection light La is used as the reference light during the second period, and a differential between the detection light and the reference light is used.

First, as shown in FIG. 6A, the first light intensity distribution L2Xa for X coordinate detection and the second light intensity distribution L2Xb for X coordinate detection are formed in the opposite directions in the X axis direction during the first period for X coordinate detection and the second period for X coordinate detection such that the absolute values thereof are the same. In this state, when the detected value LXa in the light detector 30 during the first period for X coordinate detection and the detected value LXb in the light detector 30 during the second period for X coordinate detection are the same, it can be understood that the target object Ob is located in the center in the X axis direction.

On the other hand, when the detected value LXa in the light detector 30 during the first period for X coordinate detection and the detected value LXb in the light detector 30 during the second period for X coordinate detection are different from each other, the amount of control (the driving current) for the light emitting element 12 is adjusted such that the detected values LXa and LXb are the same. Then, as shown in FIG. 6B, again, the first light intensity distribution L2Xa for X coordinate detection is formed during the first period for X coordinate detection, and the second light intensity distribution L2Xb for X coordinate detection is formed during the second period for X coordinate detection. As a result, when the detected value LXa in the light detector 30 during the first period for X coordinate detection and the detection value LXb in the light detector 30 during the second period for X coordinate detection are the same, the X coordinate of the target object Ob can be detected based on the ratio, the difference, or the like between the adjustment amount ΔLXa of the amount of control for the light emitting element 12 during the first period for X coordinate detection and the adjustment amount ΔLXb of the amount of control for the light emitting element 12 during the second period for X coordinate detection. According to such a method, even in a case where surrounding light other than the detection light L2, for example, an infrared component included in external light is incident to the light detector 30, the intensity of the infrared component included in the surrounding light is offset when the amount of control for the light emitting element 12 is adjusted such that the detected values LXa and LXb are the same. Therefore, the infrared component included in the surrounding light has no influence on the accuracy of detection.

As above, in order to acquire the positional information of the target object Ob in the X axis direction based on the detection result acquired in the light detector 30, a configuration in which a microprocessor unit (MPU) is used as the position detecting unit 50, and the process is performed by executing predetermined software (an operation program) using the microprocessor unit may be employed. In addition, as described with reference to FIGS. 5A and 5B, a configuration in which the process is performed by a signal processing unit using hardware such as a logic circuit may be employed.

Major Advantages of This Embodiment

As described above, according to the optical-type position detecting device 10 of this embodiment, the light source device 11 forms the light intensity distribution L2Zab for separation distance detection in which the intensity changes in the direction of the normal line of the first face 41 on the first face 41 side (the detection region 10R) by emitting the detection light L2 from the second face 42 side of the translucent member 40 that is a side opposite to the first face 41 side of the translucent member 40 on which the target object Ob is located. In addition, the reflected light L3 that is reflected by the target object Ob and is transmitted to the second face 42 side of the translucent member 40 is detected by using the light detector 30. Here, in the light intensity distribution L2Zab for separation distance detection, there is a predetermined relationship between the separation distance LZ1 from the translucent member 40 and the intensity. Thus, when the relationship between the separation distance from the translucent member 40 and the intensity of the detection light is acquired in advance, the separation distance detecting section 53 of the position detecting unit 50 can detect a separation distance between the target object Ob and the translucent member 40 based on the result of light reception in the light detector 30. Therefore, according to this embodiment, an expensive imaging device or complex image processing requiring a processing time is not required. Accordingly, an optical-type position detecting device 10 that has superior responsiveness can be configured at low cost.

In addition, when the target object Ob is brought into contact with the translucent member 40, boundary reflection of the detection light L2 does not occur. Accordingly, the intensity of light received by the light detector 30 has a value that deviates from the light intensity distribution L2Zab for separation distance detection. Therefore, the separation distance detecting section 53 of the position detecting unit 50 can determine a position at the time when the intensity detected by the common light detector 30 becomes a value deviated from the light intensity distribution L2Zab for separation distance detection to be a position at which the target object Ob is brought into contact with the translucent member 40.

In addition, the first face 41 of the translucent member 40 has elasticity and an embedding property in regard to the target object Ob. Thus, when the target object Ob is brought into contact with the first face 41 of the translucent member 40, the first face 41 of the translucent member 40 is deformed so as to be embedded with the target object Ob. Accordingly, the state in which the target object Ob and the translucent member 40 are in proximity to each other is clearly switched completely to the state in which the target object Ob and the translucent member 40 are brought into contact with each other. Thus, when the target object Ob arrives at a position extremely close to being brought into contact with the translucent member 40, the intensity of detection light that is detected by the light detector 30 changes in a rapid manner. Accordingly, the separation distance detecting section 53 of the position detecting unit 50 can accurately detect the contact of the target object Ob with the translucent member 40.

In addition, according to this embodiment, when the target object Ob presses the first face 41 of the translucent member 40, the translucent member 41 is compressed so as to have a decreased thickness. In addition, the propagation characteristics may change depending on the material of the translucent member 40. Accordingly, the burial depth detecting section 56 of the position detecting unit 50 can detect the burial depth LZ2 (the amount of burial) of the target object Ob based on the result of light reception in the common light detector 30 at a time when the target object Ob presses the first face 41 of the translucent member 40. In addition, the first face 41 of the translucent member 40 has an embedding property in regard to the target object Ob. Thus, when the target object Ob presses the first face 41 of the translucent member 40, the first face 41 of the translucent member 40 is embedded with the target object Ob, and the boundary surface between the target object Ob and the first face 41 is in a stable state. Accordingly, since the reflection of detection light on the boundary surface between the target object Ob and the first face 41 is stable, the burial depth LZ2 (the relative position) of the target object Ob with respect to the translucent member 40 can be accurately detected in an optical manner.

In addition, according to this embodiment, since the contact of the target object Ob with the translucent member 40 can be accurately determined, the burial depth LZ2 of the target object Ob based on the contact position of the target object Ob with the translucent member 40 or the separation distance LZ1 of the target object Ob can be accurately detected.

Here, since the first face 41 of the translucent member 40 is formed from a silicone resin or silicone rubber, a configuration in which the first face 41 of the translucent member 40 has elasticity and an embedding property in regard to the target object Ob can be easily realized.

In addition, according to the optical-type position detecting device 10 of this embodiment, since the light source of the light source device 11 is the light emitting element 12 (the light emitting diode), the light source device 11 can be configured to be miniaturized at low cost. In addition, since the light detector 30 is configured by a light sensitive element such as a photodiode or a phototransistor, the light detector 30 can be configured to be miniaturized at low cost.

In addition, according to this embodiment, the light source device 11 forms a light intensity distribution (light intensity distribution for X coordinate detection) for in-plane position detection in which the intensity changes in the in-plane direction (the X axis direction) along the first face 41. Accordingly, the position (the X coordinate) in the in-plane direction of the target object Ob can be detected by using the common light detector 30, in addition to the separation distance of the target object Ob from the translucent member 40 and contact between the target object Ob and the translucent member 40.

Embodiment 2

While in Embodiment 1 an example in which the position (the X coordinate) of the target object Ob in the in-plane direction is detected, in addition to the separation distance of the target object Ob from the translucent member 40 and contact between the target object Ob and the translucent member 40, by using the common light detector 30 in the optical-type position detecting device 10 has been described, an example in which the YX coordinates of the target object Ob is further detected will be described with reference to FIGS. 7A to 10D.

Entire Configuration

Figure 7A:
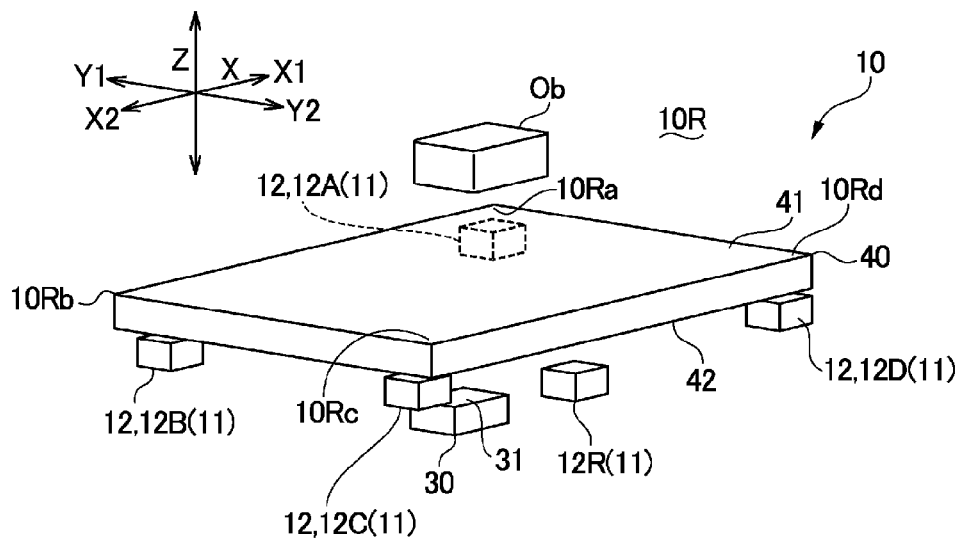
FIGS. 7A and 7B are explanatory diagrams schematically showing a major portion of an optical-type position detecting device according to Embodiment 2 of the invention.
Figure 7B:
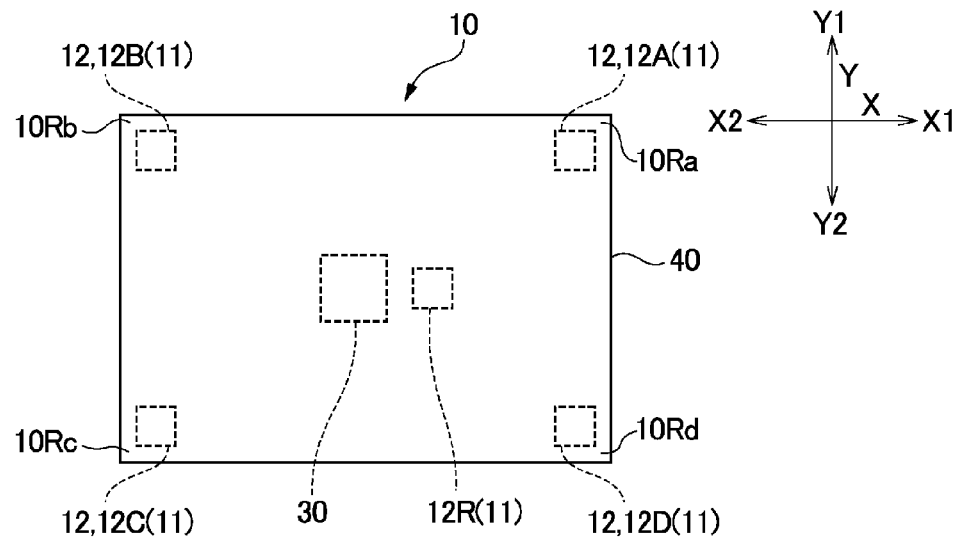
Figure 8:
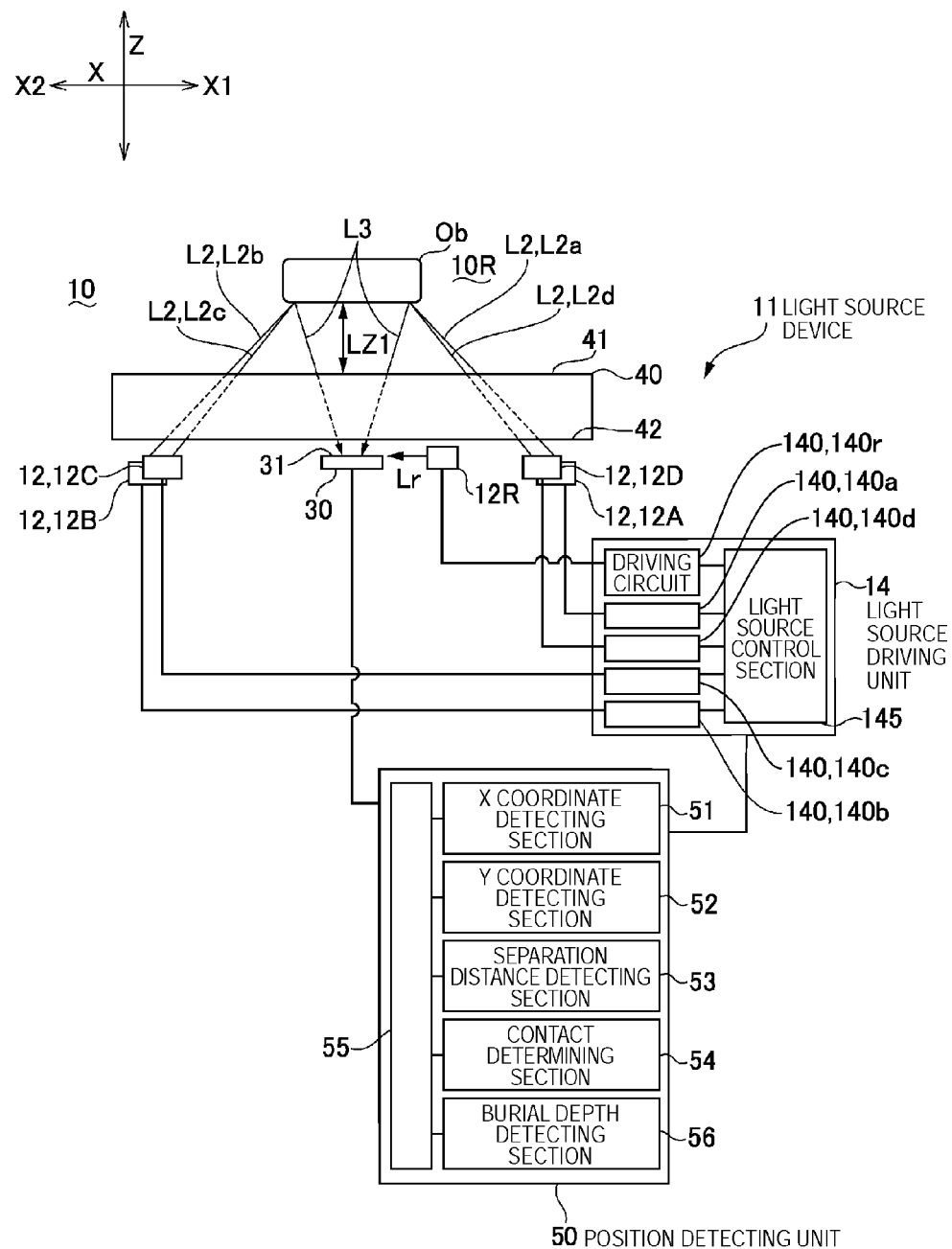
FIG. 8 is an explanatory diagram showing the entire configuration of the optical-type position detecting device according to Embodiment 2 of the invention.

FIGS. 7A and 7B are explanatory diagrams schematically showing a major portion of an optical-type position detecting device according to Embodiment 2 of the invention. FIG. 7A is an explanatory diagram showing the three-dimensional disposition of constituent elements of the optical-type position detecting device, and FIG. 7B is an explanatory diagram showing the planar disposition of the constituent elements of the optical-type position detecting device. FIG. 8 is an explanatory diagram showing the entire configuration of the optical-type position detecting device according to Embodiment 2 of the invention. The basic configuration of this embodiment is the same as that of Embodiment 1. Thus, the same reference sign is attached to each common part, and detailed description thereof is omitted.

In FIGS. 7A, 7B, and 8, the optical-type position detecting device 10 of this embodiment, similarly to Embodiment 1, is an optical-type sensor device that detects a separation distance LZ1 (see FIG. 8) between a target object Ob, which is located on the first face 41 side of a sheet-shaped or plate-shaped translucent member 40, and the translucent member 40 and the like. The optical-type position detecting device 10 is used as a tactile sensor of a robot hand apparatus or a touch panel to be described later.

In order to perform such a detection operation, the optical-type position detecting device 10 of this embodiment includes: the sheet-shaped or plate-shaped translucent member 40 that has the first face 41 directed along the XY plane; a light source device 11 that emits detection light L2 from the second face 42 side of the translucent member 40 that is a side opposite to the first face 41 side thereof; and a light detector 30 that detects reflected light L3 being reflected by the target object Ob and being transmitted to the second face 42 side of the translucent member 40.

In this embodiment, the light source device 11 includes four light emitting elements 12 (light emitting elements 12A to 12B) for position detection. The four light emitting elements 12A and 12B have light emitting faces directed toward the translucent member 40 in positions separated from one another in the X axis direction and the Y axis direction. The light emitting elements 12A to 12D are configured by LEDs (light emitting diodes) or the like. In this embodiment, the light emitting elements 12A to 12D emit detection light L2a to L2d that is formed from infrared rays as divergent light.

The light detector 30 is a photodiode that has a light sensitive portion 31 directed toward the translucent member 40. The light detector 30 is disposed between positions in which two light emitting elements 12A and 12B are disposed on the second face 42 side of the translucent member 40.

In this embodiment, similarly to Embodiment 1, the light source device 11 also includes a reference light emitting element 12R that emits reference light L2r toward the light detector 30. The reference light emitting element 12R, similarly to the light emitting elements 12 (the light emitting elements 12A to 12D) for position detection, is configured by an LED (light emitting diode) or the like, and the light emitting element 12R emits the reference light L2r that is formed from infrared rays as divergent light. However, a light shielding cover (not shown in the figure) is disposed in the reference light emitting element 12R. Accordingly, the reference light L2r emitted from the reference light emitting element 12R is not incident to the first face 41 side (the detection region 10R) of the translucent member 40.

In this embodiment, the light source driving unit 14 shown in FIG. 8 includes a light source driving circuit 140 that drives the light emitting elements 12 and a light source control section 145 that controls the lighting patterns of the light emitting elements 12 (the light emitting elements 12A to 12D) for position detection and the reference light emitting element 12R through the light source driving circuit 140. The light source driving circuit 140 is configured by light source driving circuits 140a to 140d and 140r that respectively drive five light emitting elements 12A to 12D and 12R. The light source control section 145 controls all the light source driving circuits 140a to 140d and 140r.

Since a position detecting unit 50 is electrically connected to the light detector 30, a detection result acquired by the light detector 30 is output to the position detecting unit 50. In this embodiment, the position detecting unit 50 includes: a signal processing section 55 that includes an amplifier and the like; an X coordinate detecting section 51; a Y coordinate detecting section 52; a separation distance detecting section 53 (a Z coordinate detecting section); a contact determining section 54; and a burial depth detecting section 56. The light source driving unit 14 and the position detecting unit 50 operate in association with each other, thereby performing position detection to be described later.

Operation of Position Detection and the Like

FIGS. 9A to 9D are explanatory diagrams of position detecting light that is emitted from each light emitting element 12 of an optical-type position detecting device 10 according to Embodiment 2 of the invention. FIGS. 10A to 10D are explanatory diagrams representing the appearances of forming intensity distributions for coordinate detection by using position detecting light that is emitted from the light emitting elements 12 of the optical-type position detecting device 10 according to Embodiment 2 of the invention.

In the optical-type position detecting device 10 of this embodiment, a detection region 10R is set on the first face 41 side of the translucent member 40, and the light emitting elements 12A and 12B of the light source device 11 form light intensity distributions described below.

Figure 9A:
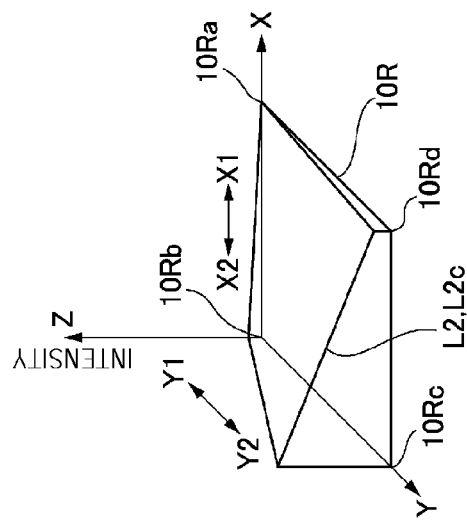
FIGS. 9A to 9D are explanatory diagrams of position detecting light that is emitted from each light emitting element of an optical-type position detecting device according to Embodiment 2 of the invention.
Figure 9B:
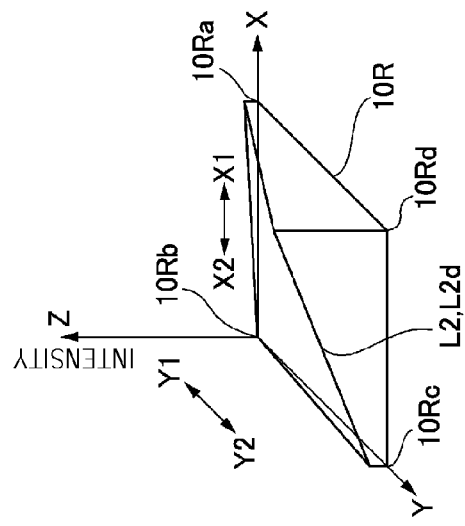
Figure 9C:
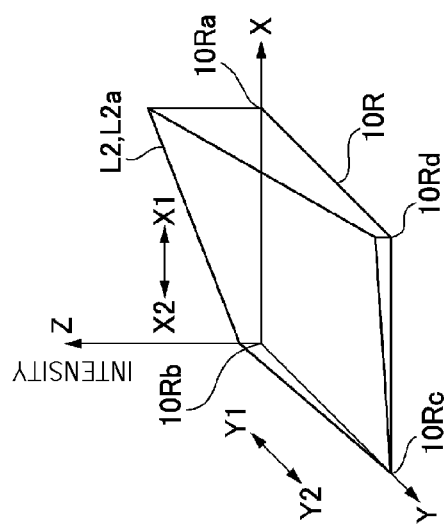
Figure 9D:
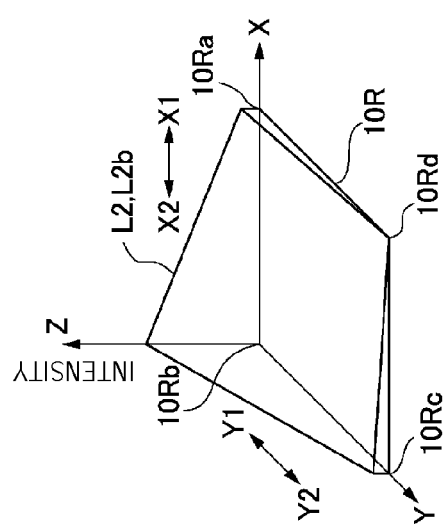

First, the detection region 10R, for example, is a quadrangle, and four light emitting elements 12A to 12D have center optical axes directed toward four corner portions 10Ra to 10Rd of the detection region 10R. Accordingly, when the light emitting element 12A is lit, as shown in FIG. 9A, an intensity distribution having the corner portion 10Ra of the detection region 10R formed as its center is formed. On the other hand, when the light emitting element 12B is lit, as shown in FIG. 9B, an intensity distribution having the corner portion 10Rb of the detection region 10R formed as its center is formed. When the light emitting element 12C is lit, as shown in FIG. 9C, an intensity distribution having the corner portion 10Rc of the detection region 10R formed as its center is formed. On the other hand, when the light emitting element 12D is lit, as shown in FIG. 9D, an intensity distribution having the corner portion 10Rd of the detection region 10R formed as its center is formed.

Figure 10A:
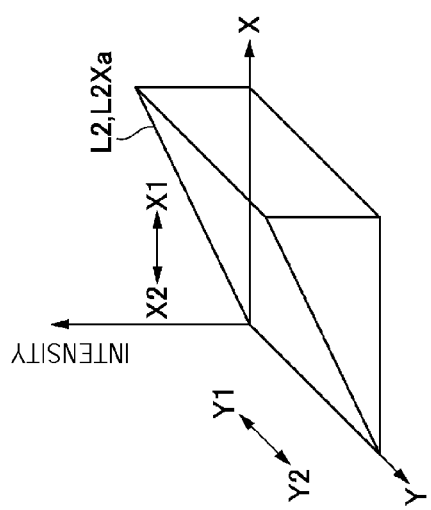
FIGS. 10A to 10D are explanatory diagrams representing the appearances of forming intensity distributions for coordinate detection by using position detecting light that is emitted from the light emitting elements of the optical-type position detecting device according to Embodiment 2 of the invention.
Figure 10B:
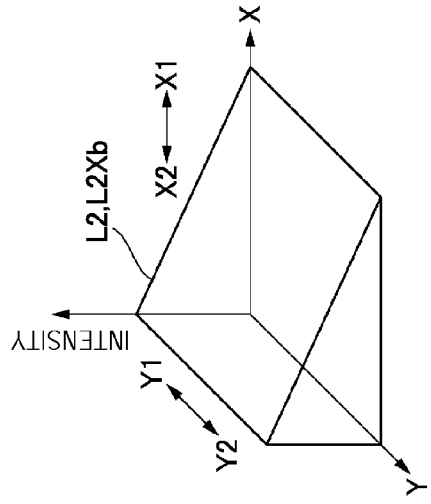

Thus, when the light emitting elements 12A and 12D are in a lit state, and the other light emitting elements 12 are in a non-lit state, as shown in FIG. 10A, the first light intensity distribution L2Xa (the intensity distribution for the first coordinate detection or the first intensity distribution for the first coordinate detection) for X coordinate detection in which the intensity of detection light steadily decreases from one side X1 in the X axis direction toward the other side X2 is formed. In this embodiment, in the first light intensity distribution L2Xa for X coordinate detection, the intensity of the detection light L2 linearly changes from one side X1 in the X axis direction toward the other side X2, and the intensity of the detection light L2 is constant in the Y axis direction. In contrast to this, when the light emitting elements 12B and 12C are in a lit state, and the other light emitting elements 12 are in a non-lit state, as shown in FIG. 10B, the second light intensity distribution L2Xb (the intensity distribution for the first coordinate detection or the second intensity distribution for the first coordinate detection) for X coordinate detection in which the intensity of detection light steadily decreases from the other side X2 in the X axis direction toward the one side X1 is formed. In this embodiment, in the second light intensity distribution L2Xb for X coordinate detection, the intensity of the detection light L2 linearly changes from the other side X2 in the X axis direction toward the one side X1, and the intensity of the detection light L2 is constant in the Y axis direction. Therefore, according to the optical-type position detecting device 10 of this embodiment, similarly to Embodiment 1, the X coordinate detecting section 51 can detect the X coordinate of the target object Ob.

Figure 10C:
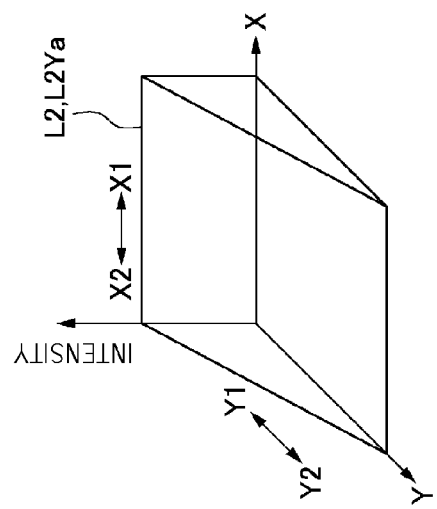
Figure 10D:
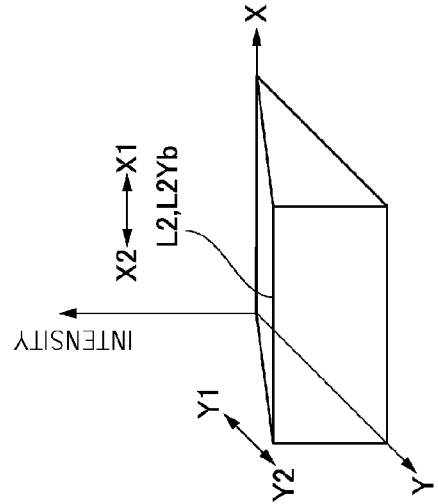

On the other hand, when the light emitting elements 12A and 12B are in a lit state, and the other light emitting elements 12 are in a non-lit state, as shown in FIG. 10C, the first light intensity distribution L2Ya (the intensity distribution for the second coordinate detection or the first intensity distribution for the second coordinate detection) for Y coordinate detection in which the intensity of detection light steadily decreases from one side Y1 in the Y axis direction toward the other side Y2 is formed. In this embodiment, in the first light intensity distribution L2Ya for Y coordinate detection, the intensity of the detection light L2 linearly changes from one side Y1 in the Y axis direction toward the other side Y2, and the intensity of the detection light L2 is constant in the X axis direction. In contrast to this, when the light emitting elements 12C and 12D are in a lit state, and the other light emitting elements 12 are in a non-lit state, as shown in FIG. 10D, the second light intensity distribution L2Yb (the intensity distribution for the second coordinate detection or the second intensity distribution for the second coordinate detection) for Y coordinate detection in which the intensity of detection light steadily decreases from the other side Y2 in the Y axis direction toward the one side Y1 is formed. In this embodiment, in the second light intensity distribution L2Yb for Y coordinate detection, the intensity of the detection light L2 linearly changes from the other side Y2 in the Y axis direction toward the one side Y1, and the intensity of the detection light L2 is constant in the X axis direction. Therefore, according to the optical-type position detecting device 10 of this embodiment, the Y coordinate detecting section 52 can detect the Y coordinate of the target object Ob by using the same method as that used for detecting the X coordinate in Embodiment 1.

Furthermore, when all the four light emitting elements 12 (the first light emitting element 12A, the light emitting element 12B, the light emitting element 12C, and the light emitting element 12D) are lit, the light intensity distribution L2Zab for separation distance detection according to Embodiment 1 described with reference to FIGS. 4A and 4B is formed. In the light intensity distribution L2Zab for separation distance detection, the intensity steadily decreases along the direction moving away from the first face 41 of the translucent member 40, and such a change can be formed as a linear change by controlling the light intensity distribution inside a limited space of the detection region 10R. In addition, in the light intensity distribution L2Zab for separation distance detection, the intensity is constant in the X axis direction and the Y axis direction. Thus, according to the optical-type position detecting device 10 of this embodiment, similarly to Embodiment 1, the separation distance LZ1 (the Z coordinates) between the target object Ob and the translucent member 40 can be detected by using the light intensity distribution L2Zab for separation distance detection and the intensity detected by the light detector 30. At that time, by using the reference light L2r, similarly to Embodiment 1, the influence of external light and the like can be cancelled.

In addition, at least the first face 41 side of the translucent member 40 has elasticity and an embedding property in regard to the target object Ob. Thus, also in this embodiment, as shown in FIG. 3A, when the target object Ob is brought into contact with the first face 41 of the translucent member 40, momentarily, the first face 41 of the translucent member 40 is in a state of being embedding with the target object Ob. When such embedding occurs, boundary reflection does not occur. Accordingly, the intensity of light received by the light detector 30, as denoted by an arrow F1 shown in FIG. 4A, deviates from the relationship defined as the light intensity distribution L2Zab for separation position detection so as to have an extremely low value LZO. Accordingly, the contact determining section 54 can determine a position at a time when the intensity detected by the light detector 30 becomes a value greatly deviated from the light intensity distribution L2Zab for separation distance detection as a position at which the target object Ob is brought into contact with the translucent member 40. Therefore, in the separation distance detecting section 53 of the position detecting unit 50, the same advantages as those of Embodiment 1 including achievement of accurate determination of the contact of the target object Ob with the translucent member 40 and the like can be acquired.

In addition, as shown in FIG. 3B, when the target object Ob presses the first face 41 of the translucent member 40, the translucent member 41 is compressed so as to have a decreased thickness. In addition, the propagation characteristics may change depending on the material of the translucent member 40. Accordingly, the burial depth LZ2 (the amount of burial) of the target object Ob can be detected based on the result of light reception in the light detector 30 at a time when the target object Ob presses the first face 41 of the translucent member 40. In addition, the first face 41 of the translucent member 40 has an embedding property in regard to the target object Ob. Thus, when the target object Ob presses the first face 41 of the translucent member 40, the first face 41 of the translucent member 40 is embedded with the target object Ob, and the boundary surface between the target object Ob and the first face 41 is in a stable state. Accordingly, since the reflection of detection light on the boundary surface between the target object Ob and the first face 41 is stable, the same advantages as those of Embodiment 1 including achievement of accurate optical detection of the burial depth LZ2 (the relative position) of the target object Ob with respect to the translucent member 40 and the like can be acquired.

Use Example 1 of Optical-Type Position Detecting Device 10

Figure 11A:
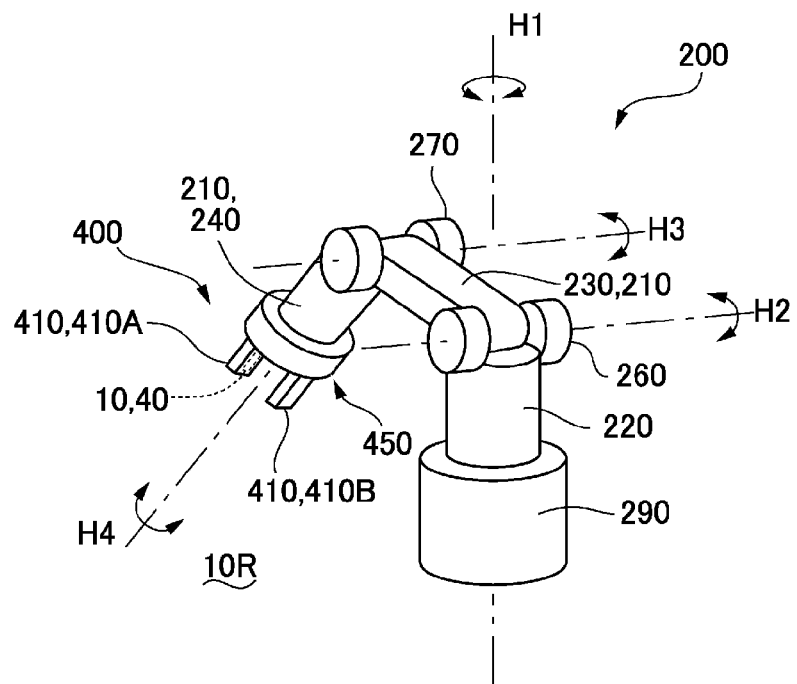
FIGS. 11A and 11B are explanatory diagrams of a robot arm that includes an optical-type position detecting device according to an embodiment of the invention in a hand apparatus as a tactile sensor.
Figure 11B:
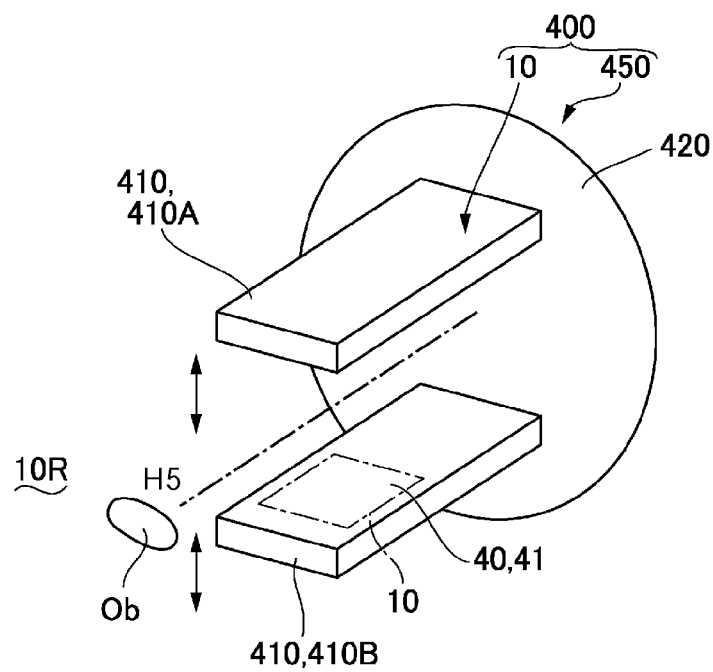

A robot hand apparatus that uses an optical-type position detecting device 10 according to an embodiment of the invention as a tactile sensor will be described with reference to FIGS. 11A and 11B. FIGS. 11A and 11B are explanatory diagrams of a robot arm that includes an optical-type position detecting device 10 according to an embodiment of the invention in a hand apparatus as a tactile sensor. FIG. 11A is an explanatory diagram of the entire robot arm, and FIG. 11B is an explanatory diagram of the hand apparatus.

The robot arm 200 shown in FIG. 11A is an apparatus that, for example, supplies and takes out a piece of work, an instrument, or the like to and from a numerical control machine tool or the like. The robot arm 200 includes a support pole 220 that stands upright from a base 290 and an arm 210. In this embodiment, the arm 210 includes the first arm portion 230 that is connected to the front end portion of the support pole 220 through the first joint 260 and the second arm portion 240 that is connected to the front end portion of the first arm portion 230 through the second joint 270. The support pole 220 can rotate around an axial line H1 that is perpendicular to the base 290, the first arm portion 230 can rotate around an axial line H2 that is set to be horizontal by the first joint 260 in the front end portion of the support pole 220, and the second arm portion 240 can rotate around an axial line H3 that is set to be horizontal by the second joint 270 in the front end portion of the first arm portion 230. A gripper or hand 450 of a gripper or hand apparatus 400 is connected to the front end portion of the second arm portion 240, and the hand 450 can rotate around an axial line H4 of the second arm portion 240.

As shown in FIG. 11B, the hand apparatus 400 has the hand 450 that includes a plurality of gripping claws 410 (gripping tools). The hand 450 has a gripping claw holding body 420 having a disc shape that holds bases of the plurality of gripping claws 410. In this embodiment, the hand 450 includes the first gripping claw 410A and the second gripping claw 410B as the plurality of gripping claws 410. Both of the two gripping claws 410 can move, as denoted by an arrow H5, in the direction moving away from each other or the direction approaching each other.

In the robot arm 200 configured as described above, in order to grip a target object Ob, after allowing the hand 450 to approach the target object Ob (piece of work) by rotating the support pole 220, the first arm portion 230, and the second arm portion 240 in a predetermined direction, the two gripping claws 410 move in the direction approaching each other so as to grip the target object Ob.

Here, when the target object Ob (piece of work) is gripped, the inner face of the gripping claw 410 that is brought into contact with the target object Ob is formed from the first face 41 of the translucent member 40 of the optical-type position detecting device 10 described in Embodiments 1 and 2. Accordingly, when the gripping claws 410 grip the target object Ob, the optical-type position detecting device 10 detects relative positions of the target object Ob and the gripping claws 410, and the result of the position detection is transmitted to a driving control unit of the gripping claws 410 as a feedback. Therefore, the gripping claws 410 can approach the target object Ob at high speed, whereby the work gripping operation can be performed at high speed.

In addition, according to the optical-type position detecting device 10 of this embodiment, the first face 41 of the translucent member 40 has elasticity and an embedding property in regard to the target object Ob. Accordingly, contact of the target object Ob with the translucent member 40 can be accurately determined. In addition, the burial depth LZ2 of the target object Ob with respect to the translucent member 40 can be accurately detected. Therefore, the hand apparatus 400 can accurately check the moment at which the gripping claw 410 is brought into contact with the target object Ob. Thus, even if the target object Ob is a fragile object, the target object Ob can be gripped without being damaged. In other words, when a fragile target object Ob is gripped, the contact pressure of the gripping claws 410 can be appropriately set.

Use Example 2 of Optical-Type Position Detecting Device 10

Figure 12A:
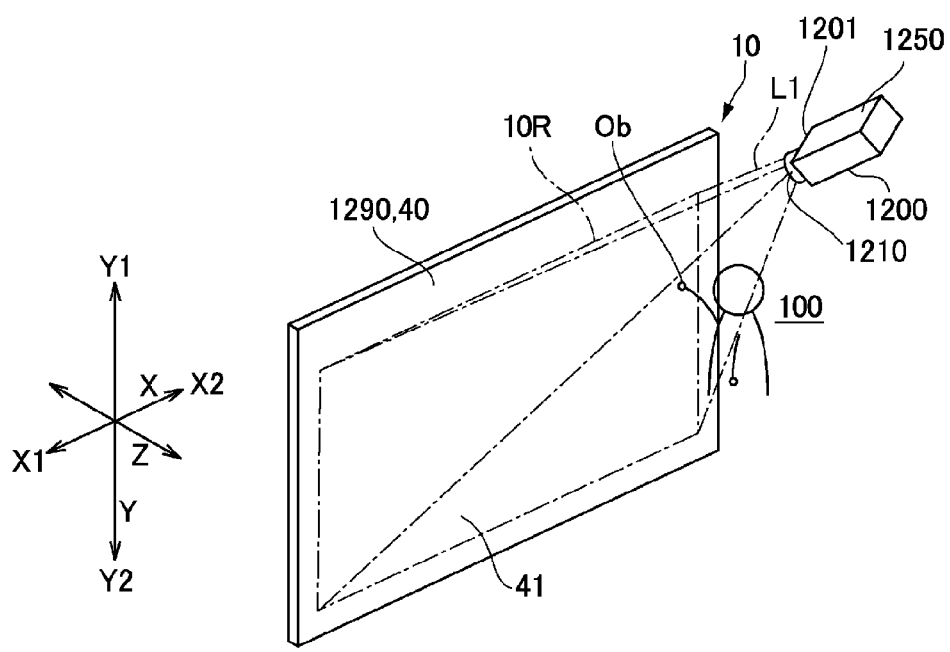
FIGS. 12A and 12B are explanatory diagrams schematically showing the configuration of a projection-type display apparatus provided with a position detecting function, which includes an optical-type position detecting device according to an embodiment of the invention as a touch panel.
Figure 12B:
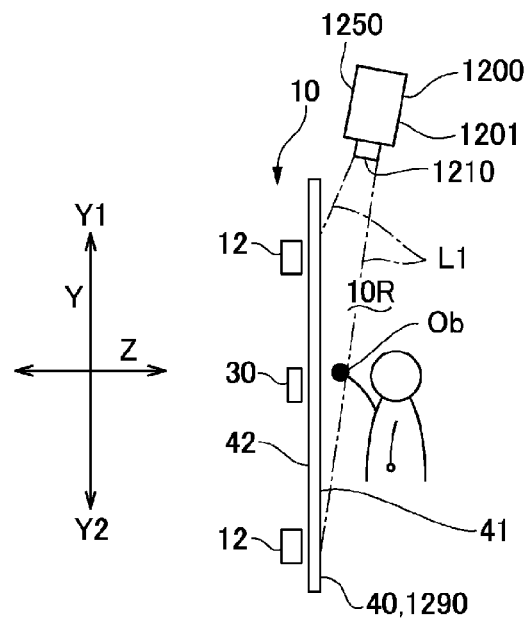

A display apparatus that uses an optical-type position detecting device 10 according to an embodiment of the invention as a touch panel will be described with reference to FIGS. 12A and 12B. FIGS. 12A and 12B are explanatory diagrams schematically showing the configuration of a projection-type display apparatus provided with a position detecting function, which includes an optical-type position detecting device 10 according to an embodiment of the invention as a touch panel. FIG. 12A is an explanatory diagram schematically showing the appearance of a major portion of the projection-type display apparatus provided with a position detecting function when viewed from the obliquely upward side. FIG. 12B is an explanatory diagram schematically showing the appearance thereof when viewed from the lateral side.

The projection-type display apparatus 100 provided with a position detecting function, which is shown in FIGS. 12A and 12B, includes an image projecting device 1200 that is referred to as a liquid crystal projector or a digital micro-mirror device. The image projecting device 1200 projects image display light L1 from a projection lens 1210 disposed on the front face portion 1201 of a casing 1250 toward a screen member 1290 in an enlarged scale.

The projection-type display apparatus 100 of this embodiment provided with a position detecting function has a function of optically detecting the position of a target object Ob inside a detection region 10R that is set in forward space (the front side of the screen member 1290) into which an image is projected. The projection-type display apparatus 100 of this embodiment provided with a position detecting function handles the XY coordinates of the target object Ob as input information that designates a part of a projected image or the like and performs switching of images based on the input information.

In order to implement the position detecting function, in the projection-type display apparatus 100 of this embodiment provided with a position detecting function, the optical-type position detecting device 10 described in Embodiment 1 or 2 is used as a touch panel, and a screen member 290 is configured by the translucent member 40 of the optical-type position detecting device 10. Accordingly, the screen surface of the screen member 290 on which an image is visually recognized is used as an input face configured by the first face 41 of the translucent member 40, and on the rear face side of the screen member 290 (the second face 42 side of the translucent member 40), the light source device 11 that includes the light emitting element 12 for position detecting light or the light detector 30 is disposed.

In the projection-type display apparatus 100 provided with a position detecting function which is configured as above, when an image displayed in the screen member 290 is indicated by a target object Ob such as a fingertip, the XY coordinates of the target object Ob are detected, and the position of the target object Ob can be handled as the input information. In addition, when the screen member 290 is pressed by the target object Ob such as a fingertip, the pressing force can be used as information or the like that directs to determine the input, switching of display images, or the like.

What is claimed is:

1. An optical detection device comprising:
   a translucent unit that has elasticity;
   a light source unit that emits detection light toward the translucent unit;
   a light sensitive unit that is directed toward the translucent unit and has light sensitivity; and
   a detection unit that detects a target object based on an intensity of light received by the light sensitive unit, wherein the light source unit includes light emitting elements, a light source driving circuit, and a reference light emitting element;

the light source driving circuit is operable to apply driving pulses with predetermined current values having opposite phases to the light emitting elements and the reference light emitting element, and light emitted by the reference light emitting element is not incident on the translucent unit.

2. The optical detection device according to claim 1, wherein the detection unit detects an amount of elastic displacement of the translucent unit based on the intensity of light received by the light sensitive unit when the target object is brought into contact with the translucent unit.

3. The optical detection device according to claim 2, wherein the light source unit forms a first light intensity distribution in which the intensity decreases as it becomes farther from the translucent unit by using the detection light transmitted through the translucent unit, and wherein the detection unit detects a position of the target object corresponding to the intensity of light received by the light sensitive unit and the first light intensity distribution.

4. The optical detection device according to claim 3, wherein the detection unit detects contact of the target object with the translucent unit when the intensity of light received by the light sensitive unit is lower than the intensity of the first light intensity distribution.

5. The optical detection device according to claim 2, wherein the translucent unit is formed from at least one of a silicone resin and a silicone rubber.

6. The optical detection device according to claim 2, wherein the light source unit forms a second light intensity distribution in which the intensity changes in a direction along a surface of the translucent unit, and wherein the detection unit detects a position of the target object corresponding to the intensity of light received by the light sensitive unit and the second light intensity distribution.

7. A hand apparatus for a robot comprising:

the optical detection device according to claim 2; and a hand for gripping the target object, wherein the translucent unit is disposed on a gripping face of the hand that is brought into contact with the target object when the target object is gripped by the hand.

8. A touch panel comprising:

the optical detection device according to claim 2; and an input face that is formed from the translucent unit.

* * * * *